(12) United States Patent
Yazdani et al.

(10) Patent No.: US 12,374,100 B2
(45) Date of Patent: Jul. 29, 2025

(54) EFFICIENT BEHAVIOR PREDICTION

(71) Applicant: Gatik AI Inc., Mountain View, CA (US)

(72) Inventors: Amir Yazdani, Mountain View, CA (US); Apeksha Kumavat, Mountain View, CA (US); Gautam Narang, Mountain View, CA (US); Arjun Narang, Mountain View, CA (US)

(73) Assignee: Gatik AI Inc., Mountain View, CA (US)

( * ) Notice: Subject to any disclaimer, the term of this patent is extended or adjusted under 35 U.S.C. 154(b) by 0 days.

(21) Appl. No.: 18/921,601

(22) Filed: Oct. 21, 2024

(65) Prior Publication Data

US 2025/0131705 A1 Apr. 24, 2025

Related U.S. Application Data

(60) Provisional application No. 63/592,010, filed on Oct. 20, 2023.

(51) Int. Cl.
| | | |
|---|---|---|
| *G06V 10/86* | (2022.01) | |
| *B60W 60/00* | (2020.01) | |
| *G06V 10/70* | (2022.01) | |
| *G06V 20/58* | (2022.01) | |
| *G06V 10/82* | (2022.01) | |

(52) U.S. Cl.
CPC ......... *G06V 10/86* (2022.01); *B60W 60/0027* (2020.02); *G06V 10/87* (2022.01); *G06V 20/58* (2022.01); *B60W 2554/20* (2020.02); *B60W 2554/4046* (2020.02); *G06V 10/82* (2022.01); *G06V 2201/08* (2022.01)

(58) Field of Classification Search
CPC ........ G06V 10/86; G06V 10/87; G06V 10/82; G06V 20/58; G06V 2201/08; B60W 60/0027; B60W 2554/20; B60W 2554/4046
See application file for complete search history.

(56) References Cited

U.S. PATENT DOCUMENTS

| | | | |
|---|---|---|---|
| 11,436,504 B1* | 9/2022 | Lukarski | G06N 5/04 |
| 2018/0330258 A1* | 11/2018 | Harris | G06N 7/01 |
| 2020/0279151 A1* | 9/2020 | Li | G06F 16/9024 |

(Continued)

FOREIGN PATENT DOCUMENTS

CN 114926823 A * 8/2022

OTHER PUBLICATIONS

Cui, Henggang, "Technically Speaking: Improving Multi-task Agent Behavior Prediction", Motional, https://motional.com/news/technically-speaking-improving-multi-task-agent-behavior-prediction, Nov. 2, 2023.

(Continued)

*Primary Examiner* — Kathleen M Broughton
(74) *Attorney, Agent, or Firm* — Jeffrey Schox; Diana Lin

(57) ABSTRACT

A method for behavior prediction of vehicles in a scene can include: recording a set of observations, determining a scene graph, determining a set of scene features, predicting agent behavior based on the scene graph, and/or controlling an autonomous vehicle. The method functions to determine vehicle controls for an autonomous vehicle based on elements in the surrounding environment and relationships between the elements.

13 Claims, 13 Drawing Sheets

(56) References Cited

U.S. PATENT DOCUMENTS

| | | | |
|---|---|---|---|
| 2021/0004012 A1* | 1/2021 | Marchetti-Bowick | ............... G05D 1/0221 |
| 2022/0067520 A1* | 3/2022 | Dalli | ............... G06N 20/00 |
| 2022/0274625 A1* | 9/2022 | Garimella | ............... G06N 3/04 |
| 2023/0229889 A1* | 7/2023 | Urtasun | ............... G06N 3/084 701/25 |
| 2023/0281430 A1* | 9/2023 | Sinop | ............... G06N 3/0455 706/15 |
| 2024/0199083 A1* | 6/2024 | Chang | ............... B60W 50/0097 |

OTHER PUBLICATIONS

Malawade, Arnav Vaibhav, et al., "ROADSCENE2VEC: A tool for extracting and embedding road scene-graphs", Knowledge-Based Systems 242 (2022) 108245.

Xi, Zerong , et al., "A Graph Representation for Autonomous Driving", Machine Learning for Autonomous Driving Workshop at the 36th Conference on Neural Information Processing Systems (NeurIPS 2022), New Orleans, USA.

Zhang, Yunpeng , et al., "GraphAD: Interaction Scene Graph for End-to-end Autonomous Driving", arXiv:2403.19098 [cs.CV], Mar. 28, 2024.

\* cited by examiner

EFFICIENT BEHAVIOR PREDICTION

CROSS-REFERENCE TO RELATED APPLICATIONS

This application claims the benefit of U.S. Provisional Application No. 63/592,010 filed 20 Oct. 2023, which is incorporated in its entirety by this reference.

TECHNICAL FIELD

This invention relates generally to the vehicle controls field, and more specifically to a new and useful autonomous vehicle planning and control system and method in the vehicle controls field.

DETAILED DESCRIPTION

The following description of the embodiments of the invention is not intended to limit the invention to these embodiments, but rather to enable any person skilled in the art to make and use this invention.

1. OVERVIEW

Figure 1:
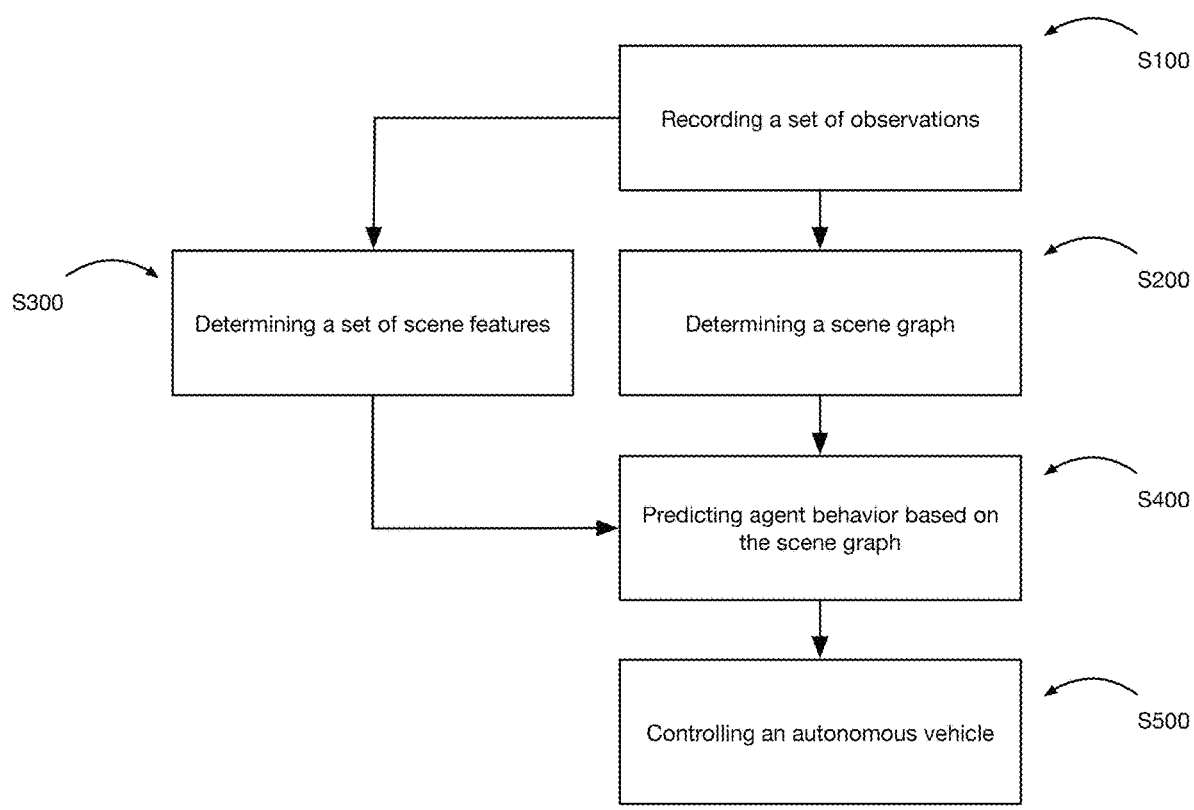
FIG. 1 is a schematic representation of a variant of the method.

As shown in FIG. 1, a method for behavior prediction of vehicles in a scene can include: recording a set of observations S100, determining a scene graph S200, determining a set of scene features S300, predicting agent behavior based on the scene graph S400, and/or controlling an autonomous vehicle S500. The method functions to determine vehicle controls for an autonomous vehicle based on elements in the surrounding environment and relationships between the elements.

2. EXAMPLES

In an illustrative example, an autonomous vehicle (AV) can capture a set of measurements of its environment using a set of sensors (e.g., cameras). Based on the measurements and the location of the AV, a scene graph can be constructed representing elements in the scene (e.g., nodes) and relationships between elements (e.g., edges). The scene graph can be generated by retrieving a stored base graph which includes a graph representation of static elements (e.g., lanelets, stop signs, traffic lights, etc.) associated with the location, and editing the base graph to include observed elements in the scene. The edges in the scene graph preferably model an interaction probability between the elements represented by the respective nodes, but can alternatively represent physical distance, influence, and/or any other suitable attribute. Based on the scene graph, a relevance can be determined for each element node, representing a scene element, relative to an ego node (e.g., the node representing the autonomous vehicle, etc.). In examples, the relationship can be determined based on graph distance between the element node and the ego node, edge weights of intervening edges (e.g., representing a complexity of a relationship and/or dependency between intermediate nodes, etc.), node parameters of intermediate nodes, and/or other information defining the relationship between nodes. Behavior models can then be assigned to different element nodes based on the respective relevance. In variants, behaviors for high-relevance nodes (e.g., close to the ego node in the scene graph, with a high probability of interaction) can be predicted using probabilistic models or neural networks, while behaviors for low-relevance nodes (e.g., far from the ego node in the scene graph) can be computed using numeric methods or rules. In an illustrative example, for a node representing a nearby vehicle in an intersection, a complex probabilistic model can be selected, and for a distant vehicle headed in a straight line in the opposite direction, a simple heuristic model can be selected. Based on motion predictions for surrounding nodes generated by each respective model, an ego motion planner can determine a motion decision (e.g., an action, a trajectory, etc.) for the autonomous vehicle node, and the autonomous vehicle can be controlled based on the resultant motion decision. Additionally or alternatively, behavior models (e.g., a graph attention network, a transformer, etc.) can be initialized based on the scene graph and trained using the set of measurements. For example, the scene graph's weights can be used to initialize the attention layer of the behavior model.

However, the method can be otherwise performed.

3. TECHNICAL ADVANTAGES

Variants of the technology can confer one or more advantages over conventional technologies.

First, variants of the technology can improve the computational efficiency of a processing system used to interpret a scene surrounding a vehicle. This benefit is achieved through the strategic use of complex models (e.g., neural networks) for highly-relevant scene elements and simple models (e.g., heuristics) for less-relevant scene elements. By allocating computational resources in this manner, fewer overall resources are required for scene interpretation. This approach differs from conventional methods that may use models of similar complexity for all scene elements, regardless of their relevance. For example, a neural network might be employed to analyze nearby vehicles, while simpler heuristics could be used for distant, stationary objects. Additionally, the use of a stored static base graph to represent static elements for multiple traversals of the same location further enhances computational efficiency. This method eliminates the need to regenerate nodes and edges for static scene elements repeatedly, allowing resources to be focused on modeling dynamic scene elements, which is typically a more complex task. As a result, the scene parsing module can be designed as a smaller and/or more efficient model. Furthermore, in variants where the attention (e.g., weights of an attention layer) of a behavior model is initialized using weights from a scene graph, the time and/or computing resources needed to train a behavior model can be significantly reduced.

Second, variants of the technology can improve the accuracy of scene interpretation and the resultant safety of a system operating based on that interpretation. This improvement is achieved through the use of accurate, predetermined, location-specific stored base graphs that represent static scene elements. These base graphs can be repeatedly verified by subsequent vehicle passes and/or determined deterministically, both of which contribute to improved graph accuracy. For instance, a base graph might include the precise locations of traffic lights, lane markings, and buildings, which can be verified and refined over time. Additionally, when adding dynamic elements (e.g., agents) to the base graph, connections can be determined both deterministically and probabilistically. This approach allows for the initialization of dynamic relationships between agents based on relationships of associated static elements. For example, an unseen car in one lane can have a new relationship with an unseen car in another lane based on the known relationship between the two lanes. This probabilistic element relationship modeling enables the system to consider unlikely events (e.g., a vehicle moving from its lane during a red light) when making decisions, thereby improving risk prediction accuracy. Furthermore, the use of diverse behavior model types enhances the system's ability to handle various scene elements and their interactions. In the event of a system failure, the static base graph can serve as a reliable fallback when the scene graph is unable to appropriately model the vehicle's surroundings.

Third, variants of the technology can confer network benefits across a fleet of vehicles that traverse the same location. This advantage is realized through the continuous verification and updating of the base graph based on multiple passes through a given location. For example, if a new traffic signal is installed or a lane configuration is changed, this information can be incorporated into the base graph and shared across the fleet. Amending the stored base graph can benefit other vehicles on the same fixed route or vehicles traversing the same fixed road section on different routes by providing them with an updated map representing scene changes not yet encountered by those vehicles. This collaborative approach to scene mapping and interpretation can lead to more robust and up-to-date environmental models for all vehicles in the network. Additionally, the usage of the base graph can inform the creation of scene graphs at the location corresponding to the base graph, even when a present combination of agents has not yet been observed at that location. This capability allows for more accurate predictions and decision-making in novel scenarios, enhancing overall system performance and safety.

However, further advantages can be provided by the system and method disclosed herein.

4. SYSTEM

In variants, the method can be performed for a scene, wherein the scene can include a set of scene elements.

The scene is preferably the physical environment traversed by a vehicle (e.g., ego vehicle), but can alternatively be a virtual scene and/or any other suitable scene.

The scene can include one or more scene elements.

Figure 4:
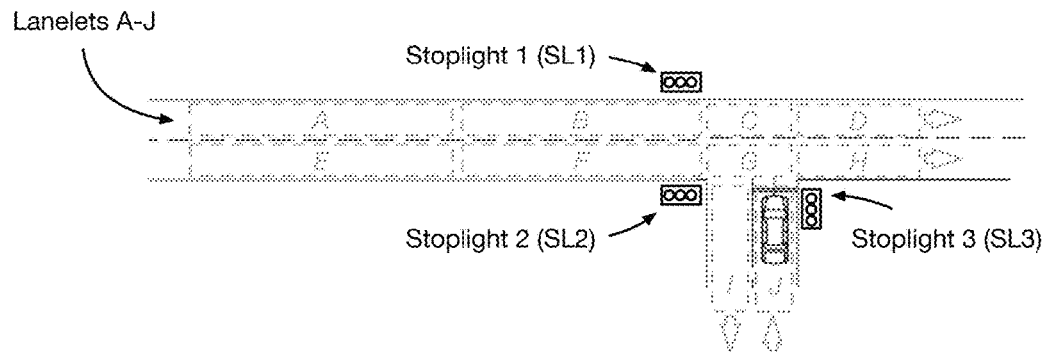
FIG. 4 is an illustrative example of a variant of a scene.

The scene elements function to represent objects within the scene. The scene elements can be, for example, physical objects, but can additionally or alternatively be virtual or conceptual objects (e.g., examples of objects shown in FIG. 4).

The scene elements can include static elements. Static elements function to represent elements that are static relative to the scene, permanent elements, nonmobile elements, or elements with a high likelihood of being present in recurring traversals of the same route. In a first example, static elements can include street signs, stop signs, traffic lights, lanes, lanelets (e.g., segments of lanes, etc.), curb cuts, sidewalks, crosswalks, intersections, bike lanes, bus lanes, street markings (e.g., lane lines, symbols, etc.), manholes, potholes, road damage, addresses, plants (e.g., trees), critical infrastructure (e.g., fire hydrants, gas lines, etc.), building fronts, building signs, crossing gate, and/or any other suitable static elements. The set of static elements and relationships are preferably represented in a stored base graph associated with a location, but can additionally or alternatively be represented in other suitable ways.

The scene elements can include dynamic elements. Dynamic elements function to represent elements that are mobile within the scene, temporary elements, or elements with low likelihood of being present in recurring traversals of the same route. The dynamic elements can include agents and non-agent dynamic elements. Agents can be moving elements in the scene with capacity for decision-making. In a first example, agents can preferably be vehicles (e.g., other vehicles on the road), but can additionally or alternatively be pedestrians, cyclists, wildlife, and/or any other suitable agents. Non-agent dynamic elements can be other transitory elements. In a first example, non-agent dynamic elements can include litter, temporary obstructions (e.g., road closure, construction equipment, and/or any other suitable temporary obstructions), and/or any other suitable non-agent dynamic elements.

The scene elements can include static or dynamic attributes. Attributes can include rotation, translation, state (e.g., red/yellow/green light; crossing gate position; and/or any other suitable state), quantitative values (e.g., speed limit), qualitative values (e.g., "slow for children walking"), constraints, and/or any other suitable attributes. Attributes can change based on global temporal changes (e.g., traffic light changing color based on schedule), local temporal changes (e.g., pedestrian crossing signal changing responsive to presence of pedestrian), conditional changes (e.g., presence of a "slow zone" when a light is flashing), driving condition changes (e.g., rainy conditions, dry conditions, icy conditions, and/or any other suitable driving condition changes), leader/follower designations (e.g., determined based on relative positioning along a road, action chaining, heuristics such as right-of-way, etc.), and/or on any other basis.

However, scene elements may be otherwise configured.

The method can be performed using a system, wherein the system can include a scene graph, a base graph, a sensor system, a processing system, a set of modules, and/or any other suitable subcomponents. The scene graph functions to represent elements and relationships between them. The scene graph is preferably generated by a scene parsing module, but can additionally or alternatively be retrieved from storage by a base graph selection module or another suitable system component.

Figures 5A, 5B:
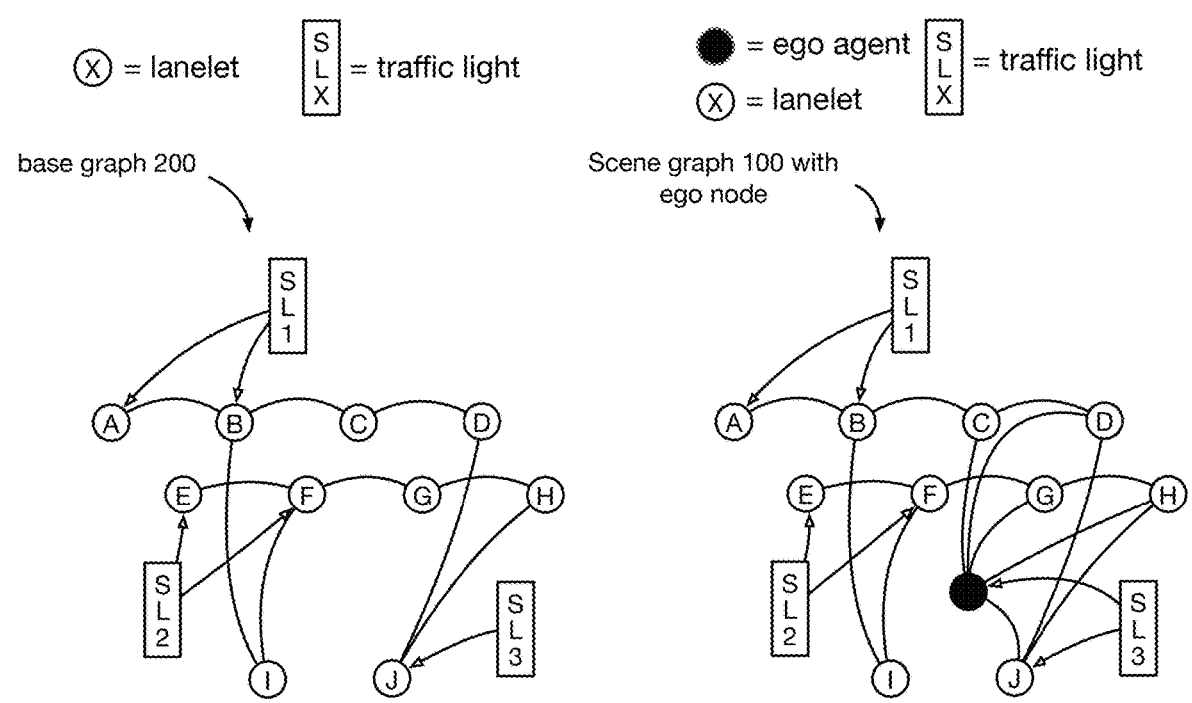
FIGS. 5A-5B are illustrative examples of variants of a scene graph representing the scene.

The scene graph 100 is preferably determined in S200, but can additionally or alternatively be determined in S400. The scene graph can be generated from a measurement set, retrieved from storage, generated by augmenting a predetermined base graph (e.g., example shown in FIG. 5A and FIG. 5B), or otherwise determined. The scene graph can be augmented (e.g., with new elements detected from vehicle measurements). The scene graph can be "pruned" (e.g., low edge weight edges being eliminated from the graph).

Regarding sparsity, the scene graph can include edges directly connecting <1%, 1%, 2%, 3%, 5%, 10%, 20%, 40%, 60%, 80%, 90%, 99%, to each of any given node.

The scene graph can be stored using an adjacency matrix, adjacency list, edge list, incidence matrix, compressed sparse row (CSR), within an object-oriented representation, and/or in another suitable format. For scene graphs generated from a base graph, the added nodes (e.g., representing dynamic elements) can be stored in the same or separate graph representation as base graph.

The scene graph can be associated with: geolocation, scene instance (e.g., specific set of elements and associated states, specific set of measurements, and/or any suitable information), timestamp, timeframe, and/or any other suitable attributes.

The scene graph can include nodes, edges, and/or any other suitable subcomponents.

Figure 6A:
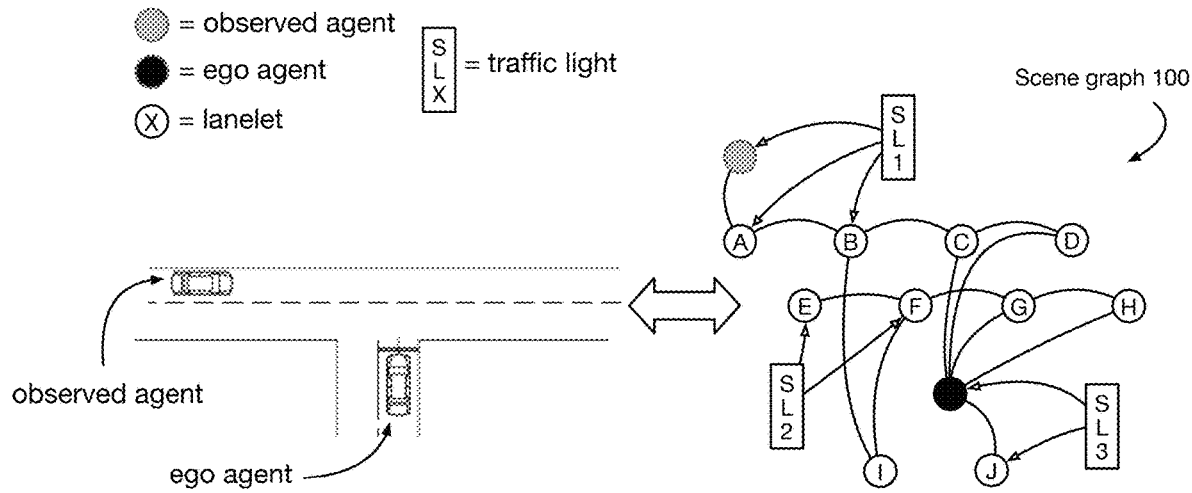
FIGS. 6A-6C are illustrative examples of variants of scenes and scene graphs determined therefrom.
Figure 6B:
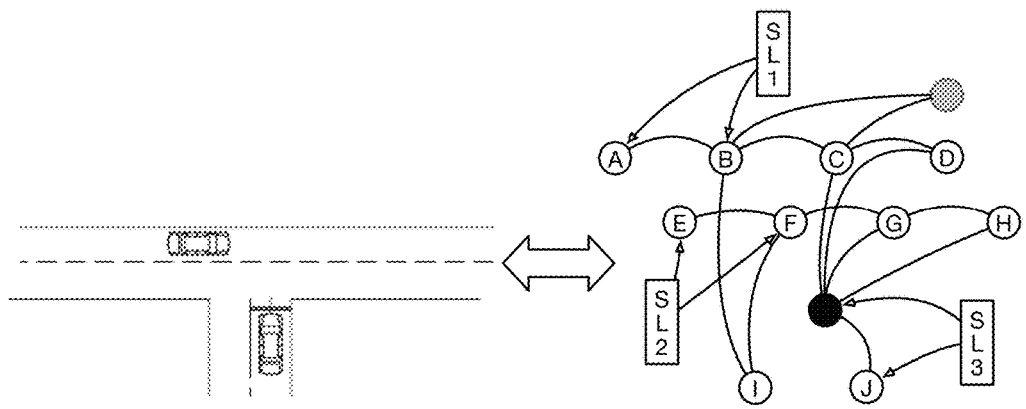
Figure 6C:
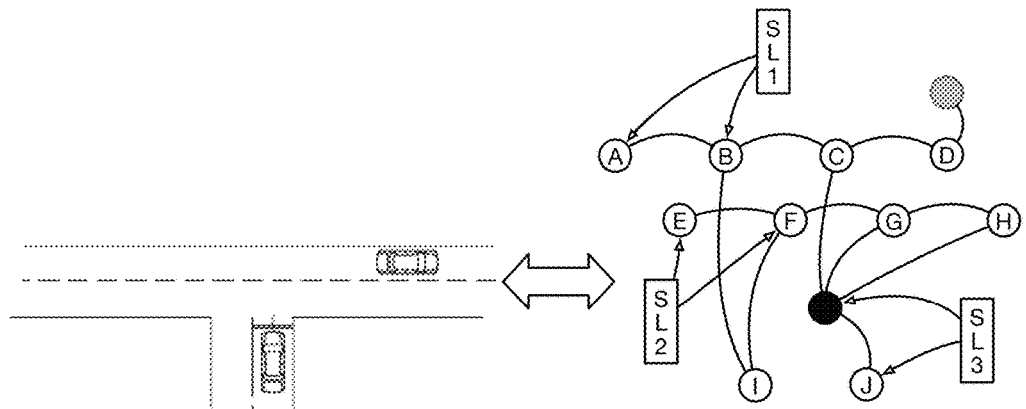

The nodes function to represent scene elements. The nodes can represent static elements and/or dynamic elements. The nodes can include static and/or dynamic attributes. The dynamic attributes can change responsive to new measurements being captured (e.g., nodes updated), or can alternatively change at a predetermined schedule, and/or any other suitable schedule. Additionally or alternatively, nodes and/or edges can be added, amended, removed, and/or otherwise modified responsive to new measurements being captured, new events and/or features being detected, and/or any other suitable condition (e.g., example shown in FIG. 6A, FIG. 6B, FIG. 6C, etc.)

The nodes can be of a generic type, or alternatively a type-specific node (e.g., "car", "pedestrian", "fire truck" with attributes specific to node type, and/or any other suitable type-specific node).

The graph preferably includes one node per element, but can additionally or alternatively be multiple nodes per element, multiple elements per node, and/or any other suitable node-to-element configuration.

The nodes can be associated with a location or alternatively not associated with a location. The location can be a specific geographic coordinate, latitude, longitude, orientation altitude, a position in a 3D model (e.g., point cloud, and/or any other suitable 3D model), pose relative to ego vehicle, a position relative to another static/dynamic element, and/or any other suitable location representation.

The nodes can be predetermined (e.g., nodes representing static elements stored in a base graph) or dynamically determined. In an example, a new node is initialized when for each dynamic element is detected in the measurement set (e.g., detected using a classifier or object detector, and/or any other suitable detection method).

The nodes can be associated with a weight. The weight can represent: detection confidence (e.g., that the respective element exists in the scene), behavior influence (e.g., whether the element will influence another element's behavior), and/or other attribute. The weight can be: assigned, predicted, and/or determined in any other suitable manner.

The nodes can be related to another element via an edge (e.g., traffic light corresponding to a lanelet, parking sign corresponding to a parking space, and/or any other suitable relationship between elements).

However, nodes may be otherwise configured.

Edges function to represent relationships between elements represented by nodes. Edges can represent static or dynamic (e.g., transient) relationships between nodes. For example, an edge between crosswalk and lanes it crosses represents a "static" relationship. In another example, an edge between pedestrian and crosswalk it occupies represents a "dynamic" relationship.

Edges can be predetermined and/or can be dynamically determined (e.g., in near-real time). Alternatively, a prior probability of an edge can be modeled as a probability distribution and used as a prior to confirm the existence of the edge.

Edges can have various connection types. In a first variant, edges connect static nodes to static nodes. In a second variant, edges connect static nodes to dynamic nodes. In a third variant, edges connect dynamic nodes to dynamic nodes.

Edges can be created in different ways. In a first variant, edges are automatically generated between nodes (e.g., new and existing nodes) and pruned (e.g., based on the respective edge weight). In a second variant, edges are assigned (e.g., manually, based on a set of rules, and/or any other suitable method) or predicted (e.g., by the module creating the nodes).

Edge existence within the scene graph can be based on edge weight, proximity, lane paths (e.g., sequential lanelets being connected), semantic category (e.g., traffic lights related to each other), referentiality (e.g., sign connected to lane to which its message applies), occupancy (e.g., dynamic element connected to element which it occupies, is predicted to occupy, has occupied, etc.), and/or otherwise determined.

Each edge can include a set of weight values. Weights can be scalar values, tensors (e.g., embeddings, set of values representing attributes, probability distributions, and/or any other suitable form), functions, binary values, and/or any other suitable type. Weights can be deterministic or probabilistic. Weights can include explicit values, embeddings, encodings, and/or be otherwise configured.

Weights can be direction-specific or bidirectional within the graph. For example, a weight can relate to one connected node differently than the other; can have a first weight in a first direction and a second weight in a second direction along the edge; and/or be otherwise configured.

Weights can represent a saliency between the connected elements, such as the probability of interaction between the connected elements, edge relevance (e.g., directed from one node to the other, non-directed, and/or any other suitable direction), edge existence, edge distance, referentiality between elements, occupancy, constraints (e.g., agent at node A representing lane A cannot cross to node B representing lane B), and/or represent any other suitable parameter or attribute of inter-element relationships. For example, edge weight can be an edge saliency score which quantitatively describes how much information from a first node affects a second node. For example, an edge between a traffic light and a car in a lane would have a higher edge saliency score than an edge between a car and a pedestrian on the sidewalk. In another example, the edge weight can represent the probability of interaction between two elements represented by the connected nodes.

Figure 7A:
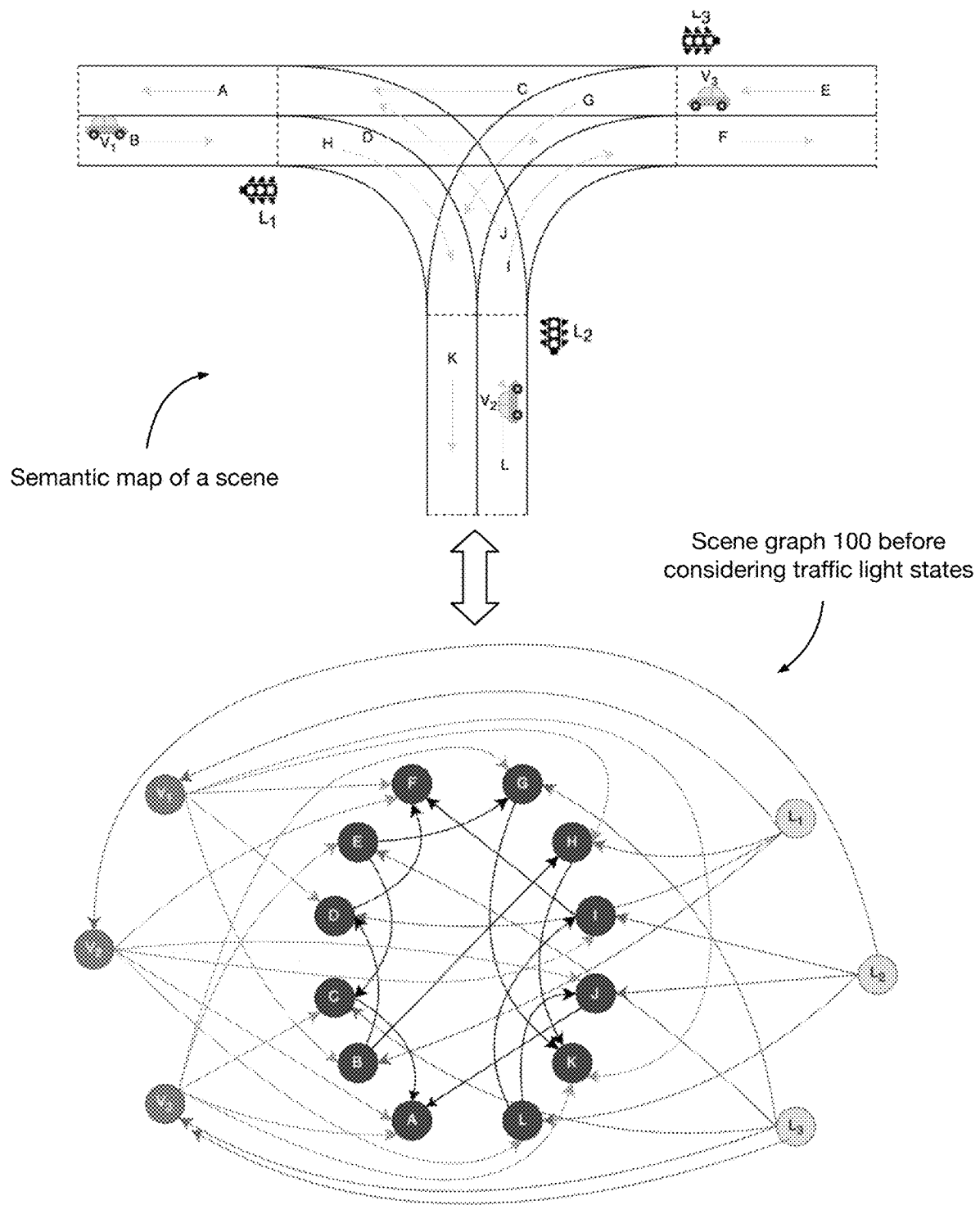
FIGS. 7A-7C are illustrative examples of variants of scenes and scene graphs determined therefrom.
Figure 7B:
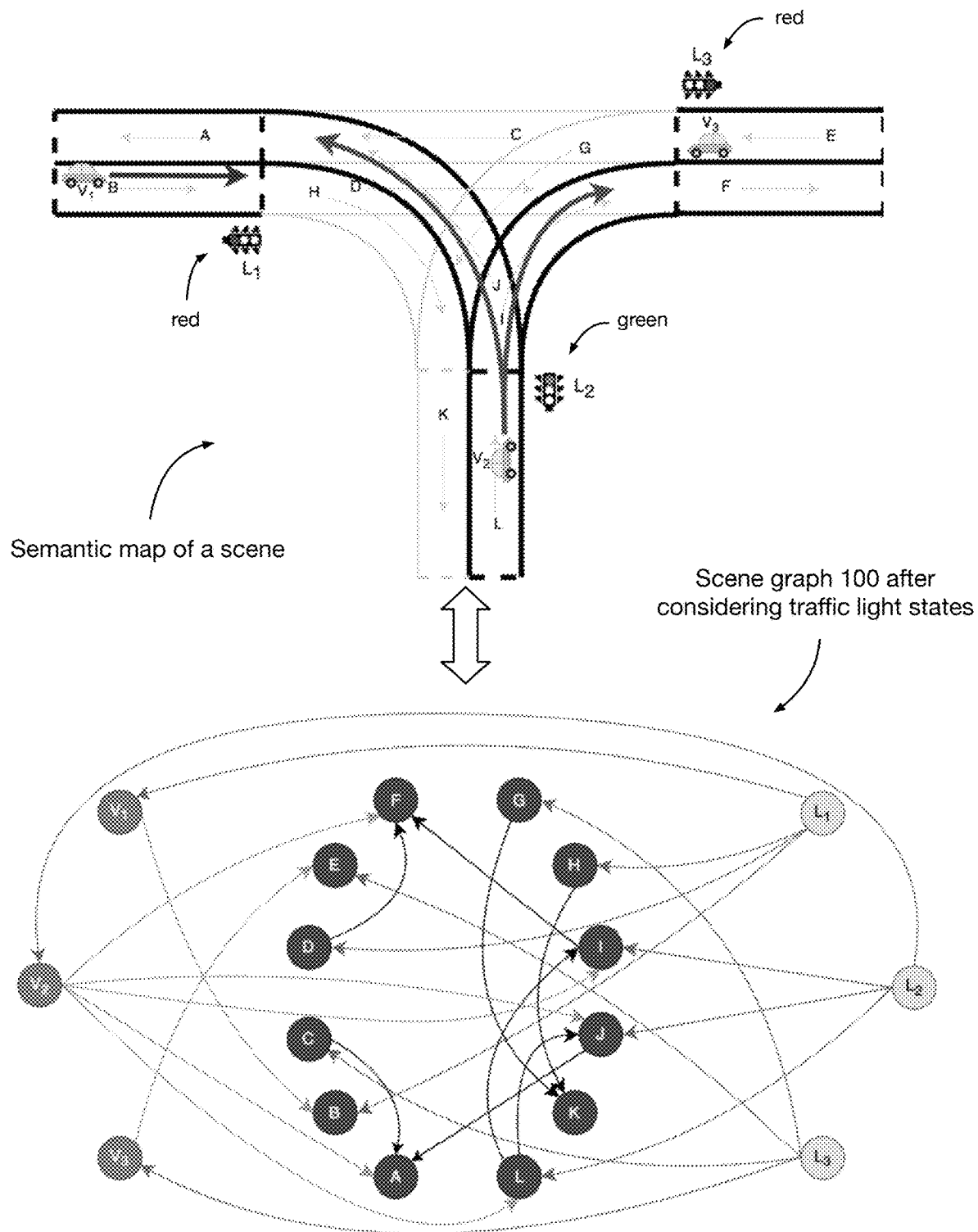
Figure 7C:
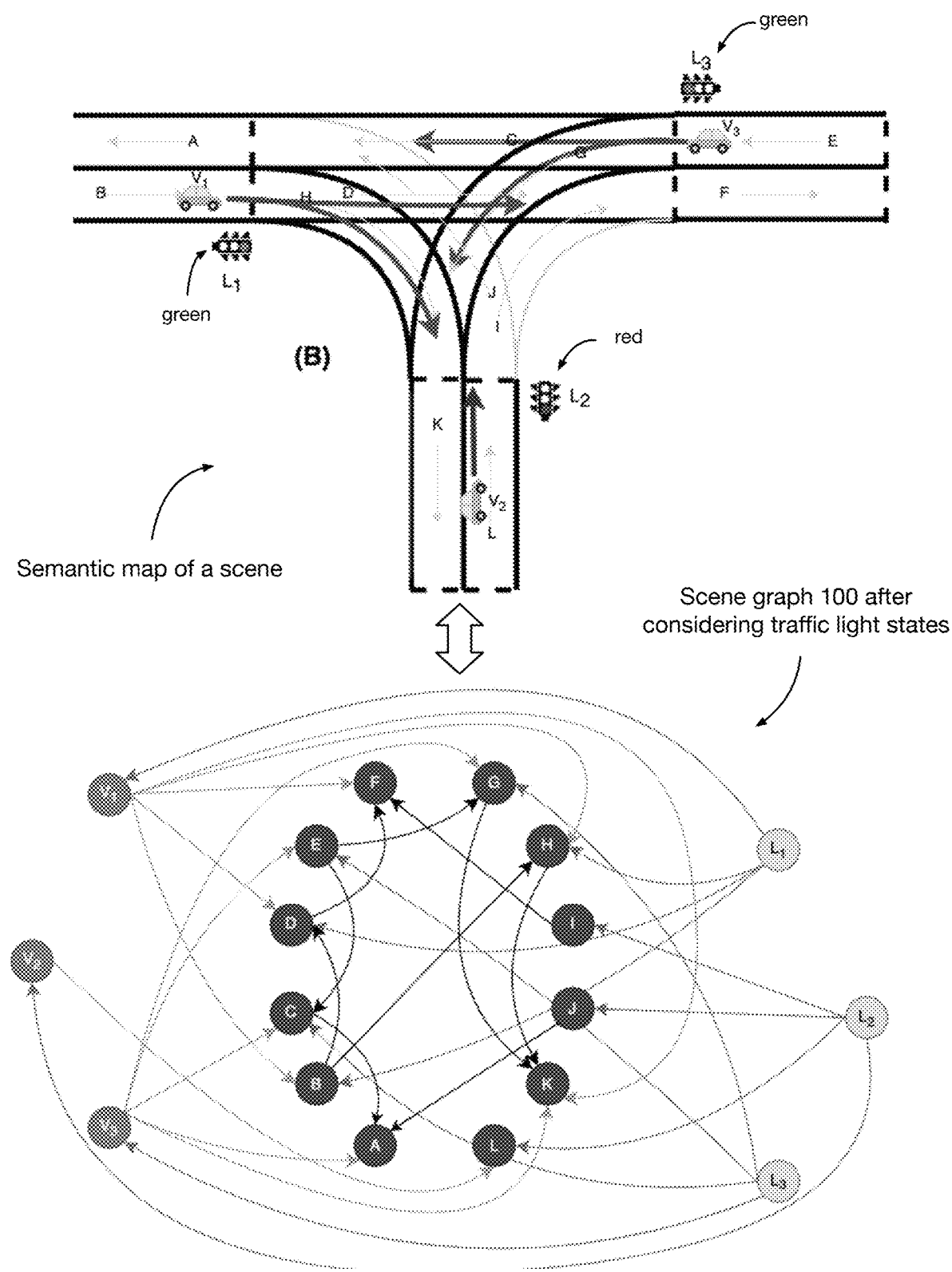

Weights can be static or dynamic (e.g., temporally vary). Weights can be predetermined or assigned in real- or near-real time. Weights can be assigned deterministically (e.g., heuristically, according to a rule set, using a lookup table for the element pair, etc.), using a priori knowledge, probabilistically, randomly initialized, set to a default value, or otherwise determined. Weights can be assigned based on the types of elements represented by the connected nodes, the states of the elements, and/or otherwise assigned. For example, weights for edges connecting static elements (e.g., entities) can be deterministically assigned, weights for edges connecting a dynamic entity to a static or dynamic entity can be probabilistically assigned, and/or the weights can be otherwise assigned. In examples, when weights drop below a threshold value, edges and/or nodes can be added and/or removed from the graph (e.g., examples shown in FIG. 7A, FIG. 7B, and FIG. 7C).

Weights for edges connecting different element types can be determined using different methods. For example, weights for edges connecting static elements are determined using heuristics. In a specific example, weight for edge connecting a traffic light node and the preceding and successive lanelet nodes are assigned a 100% interaction weight. In another example, weights for edges connecting dynamic-static elements are determined probabilistically or using prior beliefs. In a specific example, weight for edge connecting a bicycle and a stop sign is assigned based on historical bicycle-stop sign compliance. In yet another example, weights for edges connecting dynamic-dynamic elements can be determined probabilistically, predicted (e.g., using a trained neural network), computed from connections with other nodes, and/or otherwise determined.

However, edges may be otherwise configured.

However, the scene graph may be otherwise configured.

The base graph 200 functions to represent elements of a scene which are likely to be encountered given a location. The system can include one or more base graphs for each of a set of locations. The set of locations can include a series of locations along a route, a set of predetermined locations, locations having a set of predetermined characteristics (e.g., intersections, motion beyond a threshold, and/or any other suitable characteristics), a single location, and/or any other suitable set of locations.

Each base graph can be associated with a predetermined location (e.g., latitude-longitude, latitude-longitude-altitude, geocode, and/or any other suitable location identifier), base graph identifier, and/or other identifier.

In a first variant, the base graph can represent static elements associated with a location. The base graph can be determined when a route is initialized (e.g., before the beginning of the current traversal of the fixed route), additionally or alternatively during traversal of the route (e.g., updating the base graph), or determined at any other suitable time. The base graph preferably includes elements with a high likelihood of being encountered on repeat traversals of a location on a fixed route, but can additionally or alternatively include other suitable elements. However, the base graph can be otherwise initialized.

In a second variant, the base graph can include a scene graph determined at a prior timestep. In a first example, the base graph can be a prior scene graph. In a second example, the base graph can be a prior scene graph with predicted behavior changes (e.g., element location interpolated along motion vector, and/or any other suitable changes). In a third example, the base graph can be a prior scene graph with a subset of elements filtered out (e.g., dynamic elements, low-confidence elements, low-relevance elements, and/or any other suitable elements). In a fourth example, the base graph can be a prior scene graph including only elements which appear in a stored base graph associated with the location (using locations of the elements in the prior scene graph, and/or any other suitable method). However, a prior scene graph can be otherwise used as a base graph.

The base graph can include nodes representing static elements and edges connecting them, additionally or alternatively can include dynamic elements, and/or any other suitable elements. For example, the base graph can contain nodes representing lanelets, traffic signs (and/or heuristics for predicting dynamic behavior), curbs, crosswalks, and other static elements.

The base graph can be stored in various ways. In a first variant, the base graph can be stored locally (e.g., onboard the autonomous vehicle). The base graph preferably only stores base graphs relevant to a fixed route, but can additionally or alternatively store other suitable base graphs. For example, the base graph can be downloaded when a fixed route is assigned to the vehicle. In a second variant, the base graph can be stored remotely (e.g., downloaded from a remote processing system during vehicle operation in real time/substantially real time). However, the base graph can be otherwise stored.

The base graph is preferably determined before S100 or S200, but can additionally or alternatively be determined at any other suitable time. The base graph can be stored locally onboard the autonomous vehicle (e.g., downloaded in association with a fixed route before S100), additionally or alternatively downloaded from remote server during S200, and/or otherwise retrieved or received. The base graph can be predetermined based on a priori knowledge of the static elements of the scene for a given location.

However, base graph may be otherwise configured.

The sensor system 300 functions to capture the set of observations. The sensor system preferably performs S100, but can additionally or alternatively perform other processes. The sensor system is preferably mounted to the vehicle (e.g., autonomous vehicle,) but can alternatively not be mounted to the autonomous vehicle, be an external sensor system (e.g., sensor in the environment communicatively connected to processing system, mounted to the scene, etc.), and/or be any other suitable sensor system. When mounted to the autonomous vehicle, the sensor system is preferably statically mounted to the vehicle exterior, but can alternatively be mounted in another suitable position.

The observations captured by the sensor system can include images, video, location (e.g., latitude/longitude coordinates), motion data (e.g., acceleration, odometric data, and/or any other suitable motion data), light intensity, audio data, and/or any other suitable observations.

The sensor system preferably includes sensors such as a camera, location sensor (e.g., GPS receiver, visual odometry module, dead reckoning module, and/or any other suitable location sensor), accelerometer, gyroscope, wheel speed sensors, temperature sensor, infrared camera, LiDAR, RADAR, and/or any other suitable sensors.

The cameras in the sensor system preferably capture visible light, but can additionally or alternatively capture other wavelengths of light (e.g., infrared).

The sensor system can capture observations of the surrounding environment, but can additionally or alternatively capture observations of the vehicle itself (e.g., knock sensor, accelerometer, and/or any other suitable sensor for vehicle self-observation) and/or observations of any other suitable scene element.

However, sensor system may be otherwise configured.

Figure 8:
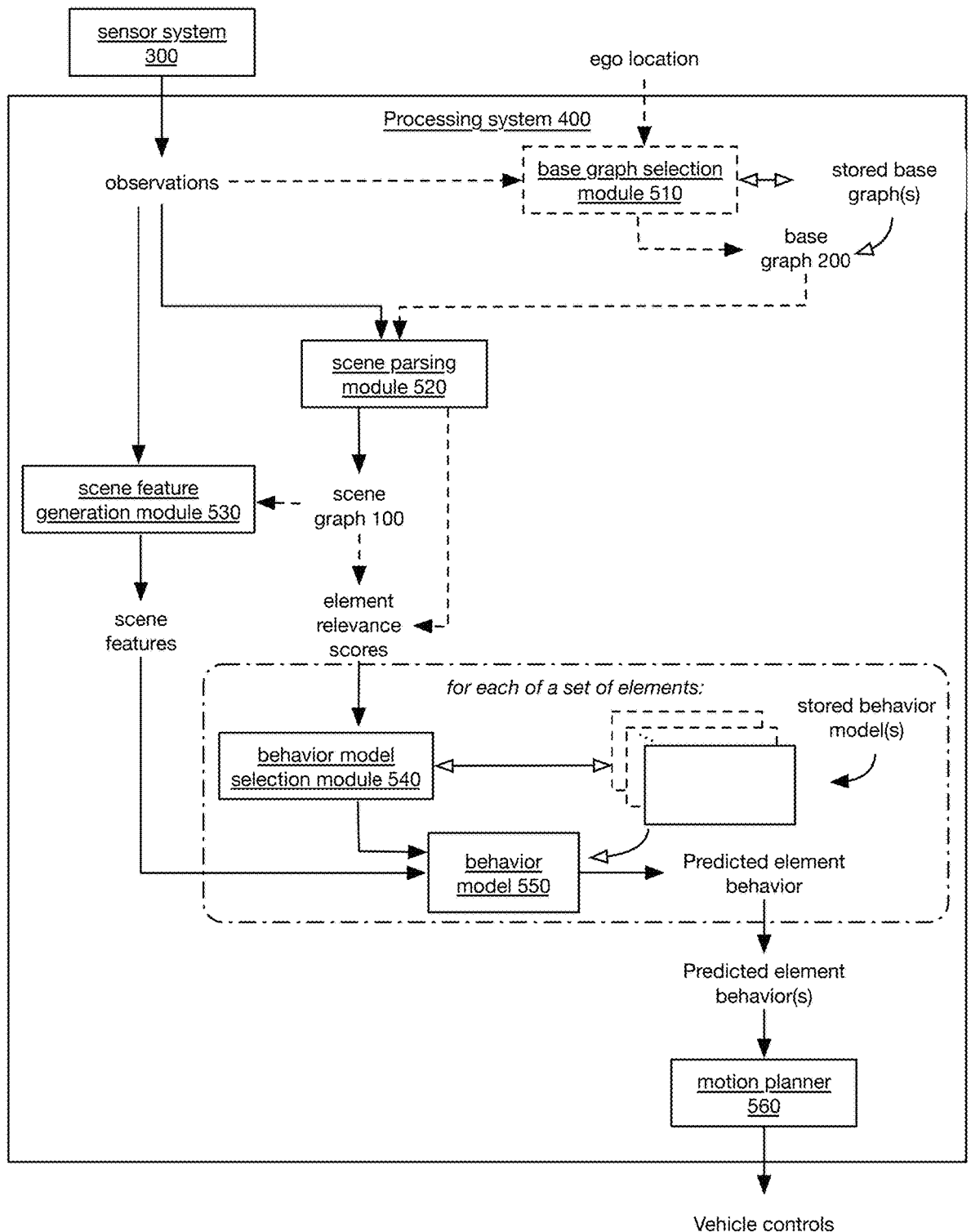
FIG. 8 is a schematic representation of a variant of the system.

The processing system 400 functions to generate insights from measurements used to inform vehicle control (e.g., example shown in FIG. 8). The processing system can optionally determine control instructions for the vehicle.

The processing system preferably performs S200-S500, but can additionally and/or alternatively perform other steps.

The processing system can store instructions defining behavior of a base graph selection module 510, scene parsing module 520, scene feature generation module 530, behavior model selection module 540, behavior models 550, a motion planner 560, and/or any other suitable modules or components.

The processing system can include a distributed set of processors, but can additionally and/or alternatively be a single set of processors.

The processing system is preferably a local computing system, but can additionally and/or alternatively be remote (e.g., in communication with a receiver onboard the autonomous vehicle).

The processing system can include a base graph selection module, scene parsing module, scene feature generation module, behavior model, behavior model selection module, motion planner, and/or any other suitable components or modules.

The base graph selection module 510 functions to determine a base graph from a set of stored base graphs based on determined location belief. The base graph selection module preferably performs S210, but can additionally and/or alternatively perform other processes.

The base graph selection module can determine the base graph by selecting a predetermined base graph or generating a set of base graphs based on the set of measurements.

In a first variant, the base graph selection module can select a predetermined base graph based on the geolocation of the vehicle.

In a second variant, the base graph selection module can select a predetermined base graph based on scene elements detected in the set of measurements. For example, the selection can be based on a unique pattern of visual features or scene elements, a scene fingerprint, and/or any other suitable scene elements.

In a third variant, the base graph selection module can generate a set of base graphs based on the set of measurements. For example, this can be done by detecting elements within the scene, initializing the graph, and learning the edge weights based on element detections and inferred interactions over successive measurements.

However, the base graph can be otherwise determined. The output of the base graph selection module can be a set of base graphs associated with location belief, and/or include any other suitable set of outputs. The base graph selection module preferably outputs one base graph, but can additionally and/or alternatively output multiple base graphs.

However, Base graph selection module may be otherwise configured.

The scene parsing module 520 functions to generate a graph representation, referred to as a scene graph, of a scene. The scene parsing module preferably performs S200, S220, but can additionally and/or alternatively perform other suitable processes.

In a first variant, the scene parsing module adds, subtracts, and/or edits nodes and/or an existing graph.

In a first embodiment, the existing graph can be a prior scene graph (e.g., scene graph from a previous iteration of the method).

In a second embodiment, the existing graph can be a base graph for the location.

In a third embodiment, the scene parsing module uses both the scene graph from a previous iteration and the base graph as priors.

In this variant, the scene parsing module can edit the existing graph by:
 detecting elements in the scene (e.g., with a set of element classifiers or element detectors, using a transformer, and/or any other suitable detection method), optionally identifying whether a corresponding node exists for the element in the scene graph (e.g., by comparing element relationships extracted from the measurements, such as relative pose to another scene element), adding a node when no corresponding node exists, and/or removing a node when no corresponding element is detected in the scene, and determining graph edges connecting the nodes.

In variants, node pruning can be limited to pruning nodes representing dynamic elements. Additionally and/or alternatively, the scene parsing module can prune nodes representing static elements.

In a first embodiment, the scene parsing module can initialize edges between a new node and existing nodes (e.g., all existing nodes), assign weights (e.g., heuristically, probabilistically, and/or any other suitable method), then prune the edges (e.g., by removing edges with less than a threshold weight or with a predetermined weight).

In a second embodiment, the scene parsing module can determine the edges connecting the nodes by inferring potential interactions from the measurement set and initialize edges between the interacting elements.

In a third embodiment, the scene parsing module can determine the edges connecting the nodes by initializing edges heuristically, based on the node type (e.g., all car nodes are connected to their respective lanelet nodes by an edge with a predetermined weight).

However, the scene parsing module can otherwise edit an existing graph based on the observed scene. In a second variant, the scene parsing module generates a new graph based on a measurement set (e.g., infers the nodes and/or edges).

However, the scene parsing module can otherwise generate a scene graph. The scene parsing module can optionally determine a relevance score of each node to an ego node (node representing AV, and/or any other suitable representation).

The scene parsing module can have inputs including observations, scene graph prior, base graph, and/or any other suitable inputs.

The scene parsing module can have outputs including the scene graph (e.g., set of nodes connected by edges), node weights, edge weights, relative importance of different nodes to ego node, and/or any other suitable outputs.

However, scene parsing module may be otherwise configured.

The scene feature generation module 530 functions to extract features from the scene and/or generate input to a behavior model.

The scene feature generation module preferably performs S300, but can additionally and/or alternatively perform other processes.

The scene feature generation module can be the same or distinct from the scene parsing module. The scene features are preferably not used to generate the scene graph, but can additionally or alternatively be used to generate the scene graph.

The scene feature generation module can be behavior model-specific, but can additionally and/or alternatively be different for different behavior models.

The scene feature generation module can be optional, wherein the behavior model directly receives the measurements as input when the system lacks a scene feature generation module.

The scene feature generation module can have input including observations, prior detected features, the scene graph, and/or other inputs.

Figure 11A:
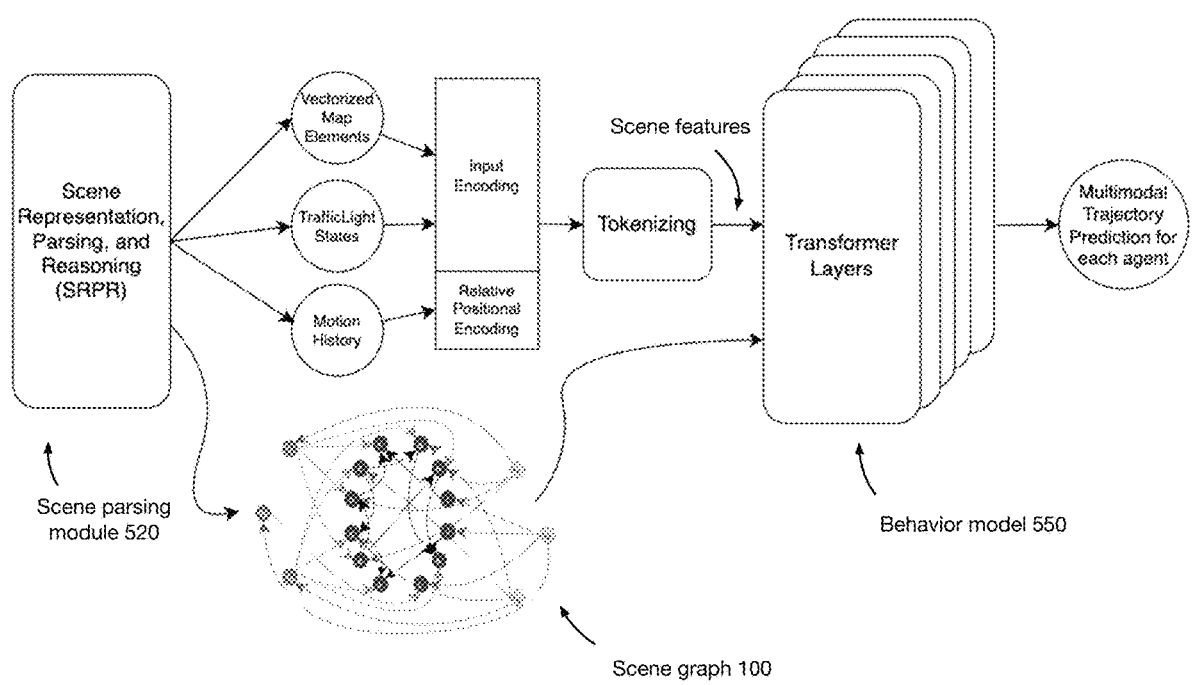
FIGS. 11A-11B are schematic representations of variants of the system.
Figure 11B:
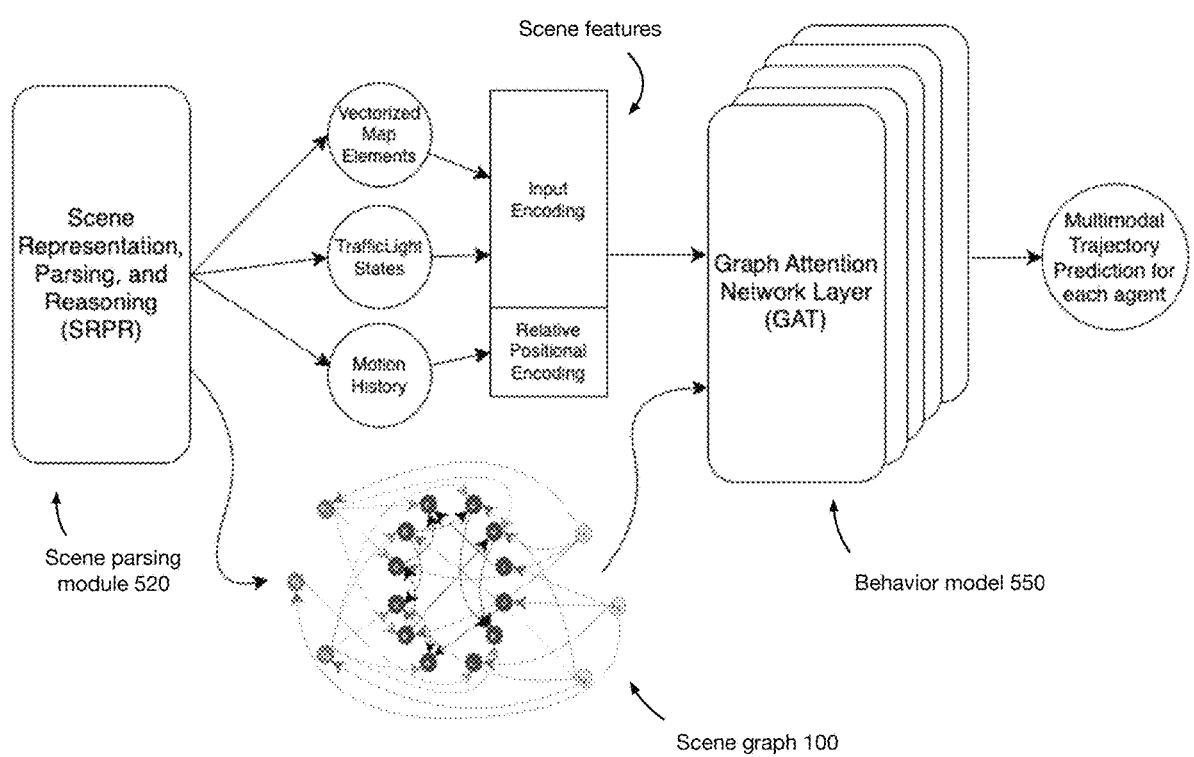

The scene feature generation module can have output including element detections, element interaction predictions, set of embeddings (e.g., overall scene embedding, embeddings corresponding to scene elements, a set of tokens representing the scene, etc.; examples shown in FIG. 11A and FIG. 11B), a graph distinct from scene graph, scene graph with features, occupancy grid graph (e.g., where nodes represent different geolocations and are arranged in a grid pattern, or other pattern), topological map (e.g., abstractly representing landmarks), and/or any other suitable output.

The scene feature generation module can be probabilistic (e.g., trained model), but can additionally and/or alternatively be deterministic or a combination of both.

However, scene feature generation module may be otherwise configured.

The behavior model 550 functions to predict behavior of an element (e.g., a dynamic element in the scene, an "agent", etc.), the ego vehicle, and/or any other suitable element.

The behavior model preferably performs S420, but can additionally and/or alternatively perform S500 and/or other processes. The behavior model preferably operates in coordination with other behavior models, but can additionally and/or alternatively operate independently.

Figure 9:
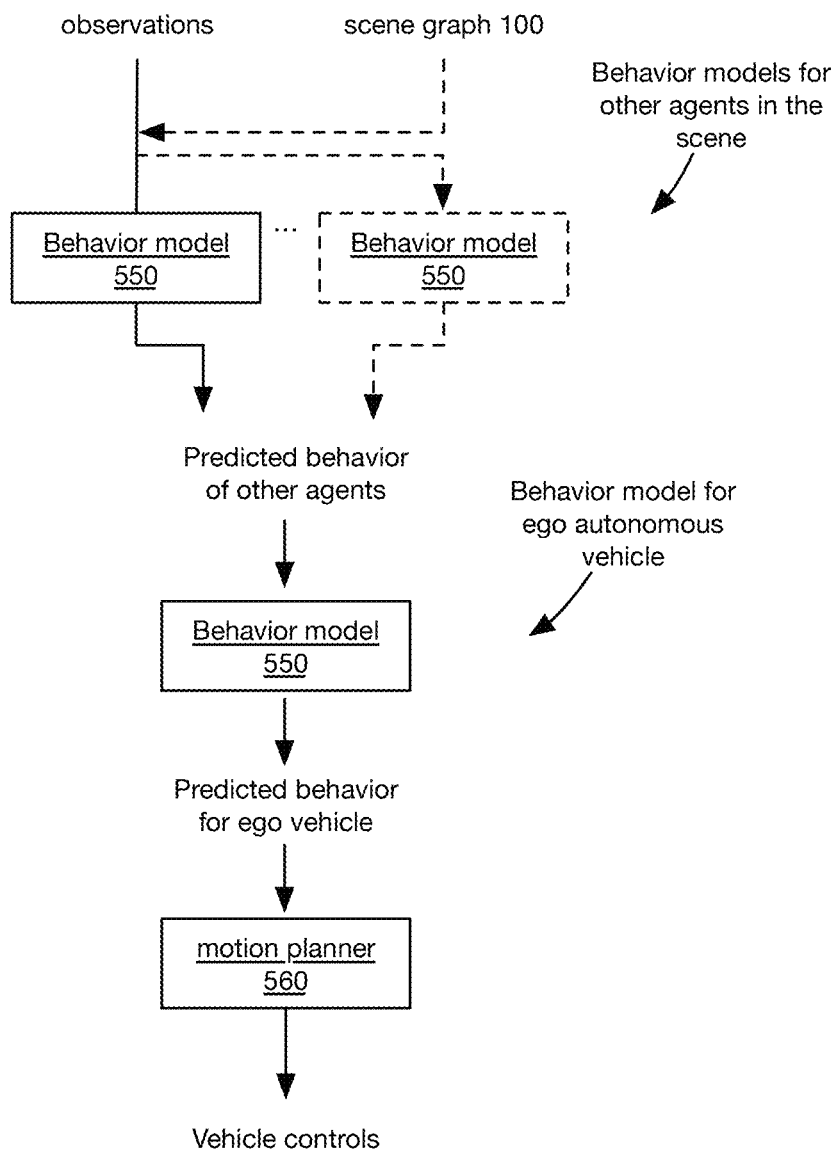
FIG. 9 is a schematic representation of a variant of behavior model arrangement.

The behavior model performs behavior prediction on a "target node". The target node is preferably a non-ego vehicle node, but can additionally and/or alternatively be an ego vehicle node (e.g., examples of behavior models shown in FIG. 9).

The behavior model is preferably stored locally, but can additionally and/or alternatively be stored remotely (e.g., off-vehicle).

The behavior model can be context-specific, but can additionally and/or alternatively be not context specific. Context examples can include "single lane road," "driveway", "highway", "3-way intersection", and/or any other suitable context.

The input to the behavior model can include scene features, scene graph (and/or subset thereof), prior output (e.g., prior behavior prediction from previous timestep, and/or any other suitable prior output), element attributes, and/or any other suitable input. The subset of scene graph can be a subset representing nodes within X graph distance (e.g., 1 edge, 2 edges, 3 edges, 5 edges, etc.), within Y real distance (e.g., 10 feet, 20 feet, 30 feet, 100 feet, 200 feet, 300 feet, etc.), and/or otherwise defined.

The output ("behavior") of the behavior model can take various forms. In a first variant, the output can be an action (e.g., "will turn right", etc.). In a second variant, the output can be a trajectory (e.g., 2D, 3D, etc.). The trajectory can be straight, spline, piecewise, continuous, discontinuous, and/or any other suitable trajectory type. In a third variant, the output can be vehicle controls (e.g., wheel turn angle, acceleration, braking, etc.) for the variant in which the behavior model is used for the ego vehicle. In a fourth variant, the output can be a constraint (e.g., will not enter space of ego vehicle with next X seconds, etc.).

The output can be deterministic (e.g., 1 behavior, multiple behaviors in series, etc.), but can additionally and/or alternatively be probabilistic. For example, the module can output the probability distribution on: different behaviors, different locations in the real world, different elements represented by nodes in the graph representing elements with which the element represented by the target node will interact, and/or any other suitable probability.

The behavior model can include deterministic and/or probabilistic mechanisms. Deterministic mechanisms can use heuristics, numerical solver, behavior rulesets, kinematic models, path planning algorithms (e.g., A*, Dijkstra's, etc.), spline interpolation/extrapolation, regression, and/or any other suitable deterministic mechanism. Probabilistic mechanisms preferably use GAT, but can additionally and/or alternatively use Markov decision processes, rapidly-exploring random trees (RRT), probabilistic roadmaps (PRM), DNN, RNN, transformers, other neural networks, and/or any other suitable probabilistic mechanism.

The models can include classical or traditional approaches, machine learning approaches, and/or be otherwise configured. The models can include regression (e.g., linear regression, non-linear regression, logistic regression, etc.), decision tree, LSA, clustering, association rules, dimensionality reduction (e.g., PCA, t-SNE, LDA, etc.), neural networks (e.g., CNN, DNN, CAN, LSTM, RNN, encoders, decoders, deep learning models, transformers, etc.), ensemble methods, optimization methods, classification, rules, heuristics, equations (e.g., weighted equations, etc.), selection (e.g., from a library), and/or other architectures. The models can extract data features (e.g., feature values, feature vectors, etc.) from the input data, and determine the output based on the extracted features. However, the models can otherwise determine the output based on the input data.

Models can be trained, learned, fit, predetermined, and/or can be otherwise determined. The models can be trained or learned using: supervised learning, unsupervised learning, self-supervised learning, transfer learning, and/or otherwise trained. The models can be learned or trained on: labeled data (e.g., data labeled with the target label), unlabeled data, positive training sets (e.g., a set of data with true positive labels, negative training sets (e.g., a set of data with true negative labels), and/or any other suitable set of data. The model can be run or updated: once; at a predetermined frequency; every time the method is performed; every time an unanticipated measurement value is received; or at any other suitable frequency. Different behavior models can be selected for different ego-relevance (e.g., relevance to the ego vehicle, etc.), element type, and/or otherwise selected. In a first example, if a non-important object is being considered, the behavior model can use deterministic and/or heuristic based prediction (e.g., constant velocity, IDM, etc.). In a second example, if an important object is being considered, the behavior model can use probabilistic and/or high-performance data-driven behavior prediction (e.g., transformers, Graph Attention networks, etc.). In a third example, if interactive agents are being considered and it is clear who is the leader and who is the follower, the behavior model can use conditional prediction. In a fourth example, if interactive agents are being considered and it is not clear who is the leader and who is the follower, the behavior model can use joint prediction. However, the behavior models can be otherwise selected.

In variants, the behavior model can include an attention mechanism. The attention mechanism is preferably initialized in S430, but can additionally or alternatively be initialized during any other suitable part of the method. The attention mechanism and/or attention coefficients can be fixed during prediction, but can additionally and/or alternatively be dynamic, and/or any otherwise vary. In a specific example, the behavior model can extract scene graph edge weights from the scene graph and use the edge weights to initialize the attention layer(s) (e.g., initialize the attention coefficients and/or the adjacency matrix, to set a static attention value, to use as a prior, etc.). The initialized model can then be trained using real-world observations (e.g., data)

from the location. In variants, this can bypass the sparse data issue endemic in neural network behavior model training by reducing the amount of data needed to train an accurate model, since the model's attention layer (e.g., attention coefficients, adjacency matrix, etc.) is initialized closer to the optimum values.

However, behavior model may be otherwise configured.

The behavior model selection module 540 functions to select a behavior model for a target node (e.g., a scene element, an agent, etc.). The behavior model selection module can include a set of rules, a voting mechanism, and/or any other suitable architectures.

The behavior model selection module preferably performs S410, but can additionally and/or alternatively perform other suitable operations.

However, behavior model selection module may be otherwise configured.

The motion planner functions to control motion of the autonomous vehicle. The motion planner can be a behavior module (e.g., where "target node" is ego node), but can additionally and/or alternatively be other suitable configurations.

The inputs to the motion planner can include scene features, predicted behavior of elements in the scene, and/or other inputs. The outputs to the motion planner can include vehicle controls, trajectory, actions, and/or any other outputs.

The motion planner can be a pure pursuit controller, stanley controller, proportional-integral-derivative (PID) controller, differential dynamic programming controller, feedforward/feedback control, frenet frame transformation module, and/or any other suitable controller.

Invariants, the behavior model and/or motion planners can be similar to those disclosed in U.S. application Ser. No. 18/225,319 filed 24 Jul. 2023, U.S. application Ser. No. 18/654,315 filed 3 May 2024, and/or U.S. application Ser. No. 18/096,695 filed 13 Jan. 2023, each incorporated herein in its entirety by this reference.

However, motion planner may be otherwise configured.

However, processing system may be otherwise configured.

5. METHOD

The method functions to develop and use a graph-based model of an autonomous vehicle's surroundings to control the autonomous vehicle. The method is preferably performed in real- or near-real time during vehicle traversal of a fixed route (e.g., within 5 ms, 1 ms, 5 ms, 10 ms, 20 ms, 50 ms, 100 ms, 300 ms, etc. from observation sampling), but can additionally or alternatively be performed asynchronously from vehicle operation (e.g., in a simulation, retroactive analysis, etc.). All or portions of the method can be performed in real time (e.g., responsive to a request), iteratively, concurrently, asynchronously, periodically, and/or at any other suitable time. All or portions of the method can be performed automatically, manually, semi-automatically, and/or otherwise performed. The method is preferably performed using the system discussed above, but can additionally or alternatively be performed using any other system.

The method can include: recording a set of observations S100, determining a scene graph S200, determining a set of scene features S300, predicting agent behavior based on the scene graph S400, and/or controlling an autonomous vehicle S500. The method functions to determine vehicle controls for an autonomous vehicle based on elements in the surrounding environment and relationships between the elements.

Recording a set of observations S100 functions to determine information about the environment of an autonomous vehicle. Recording a set of observations S100 is preferably performed by the sensor system, but can additionally and/or alternatively be performed by other system components. Recording a set of observations S100 is preferably performed while the vehicle is in motion (e.g., during a driving session along a fixed route, and/or any other suitable time), but can alternatively be performed when the vehicle is stationary. Recording a set of observations S100 can be performed before, during, or after S210 and/or at any other time. Recording a set of observations S100 is preferably synchronized with location determination, but can alternatively not be synchronized with location determination.

However, recording a set of observations S100 may be otherwise performed.

Determining a scene graph S200 functions to represent elements of the scene and relationships between elements of the scene.

Determining a scene graph S200 is preferably performed based on observations captured in S100, but can alternatively be performed at any other suitable time. For example, determining a scene graph S200 can be performed immediately after, at the same time, contemporaneously with, and/or at any other suitable time relative to recording a set of observations S100.

Determining a scene graph S200 can be performed responsive to receiving a set of observations, a trigger event, and/or any other suitable condition. For example, determining a scene graph S200 can be performed responsive to observed behavior of another agent, a traffic light changing, and/or any other suitable trigger event.

Figure 2:
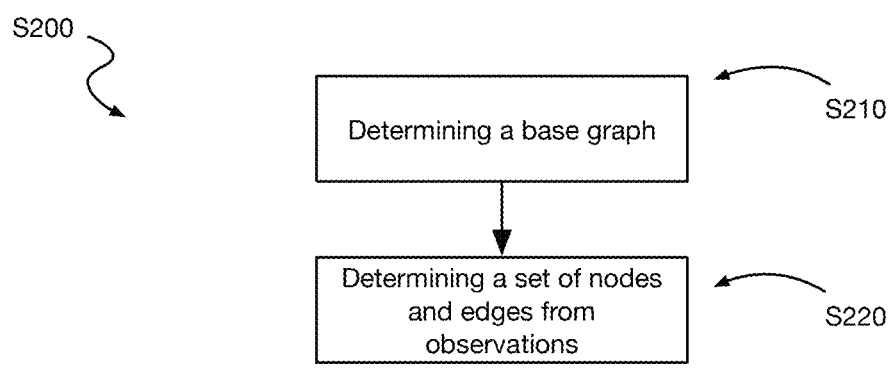
FIG. 2 is a schematic representation of a variant of determining a scene graph.

Determining a scene graph S200 can include determining a base graph S210, determining a set of nodes and edges from observations S220, and/or any other suitable substeps (e.g., example shown in FIG. 2).

Determining a base graph S210 functions to initialize the scene graph with known information. Determining a base graph S210 can be determined (e.g., retrieved, extracted, etc.) based on a location belief, based on a signal emitted by the location, and/or otherwise determined. Determining a base graph S210 is preferably performed by base graph selection module 510, but can alternatively be performed manually or by any other suitable module or component.

In a first variant, the base graph is retrieved based on the location belief. The location belief can be measured/received directly (e.g., via satellite, other wireless connection, etc.). For example, the location belief can be GPS coordinates (e.g., known location). In a second example, the location belief can be inferred from observations (e.g., matching observations to stored base graphs, odometry methods, etc.). In a first specific example, the location belief can be inferred from observations using feature-based detection and matching (e.g., scale-invariant feature transforms, etc.). In a third example, the location belief can be inferred from prior locations in a current trip (e.g., using the base graph which corresponds to a predicted and/or known next location in the route). However, the location belief can be otherwise determined.

Figure 10:
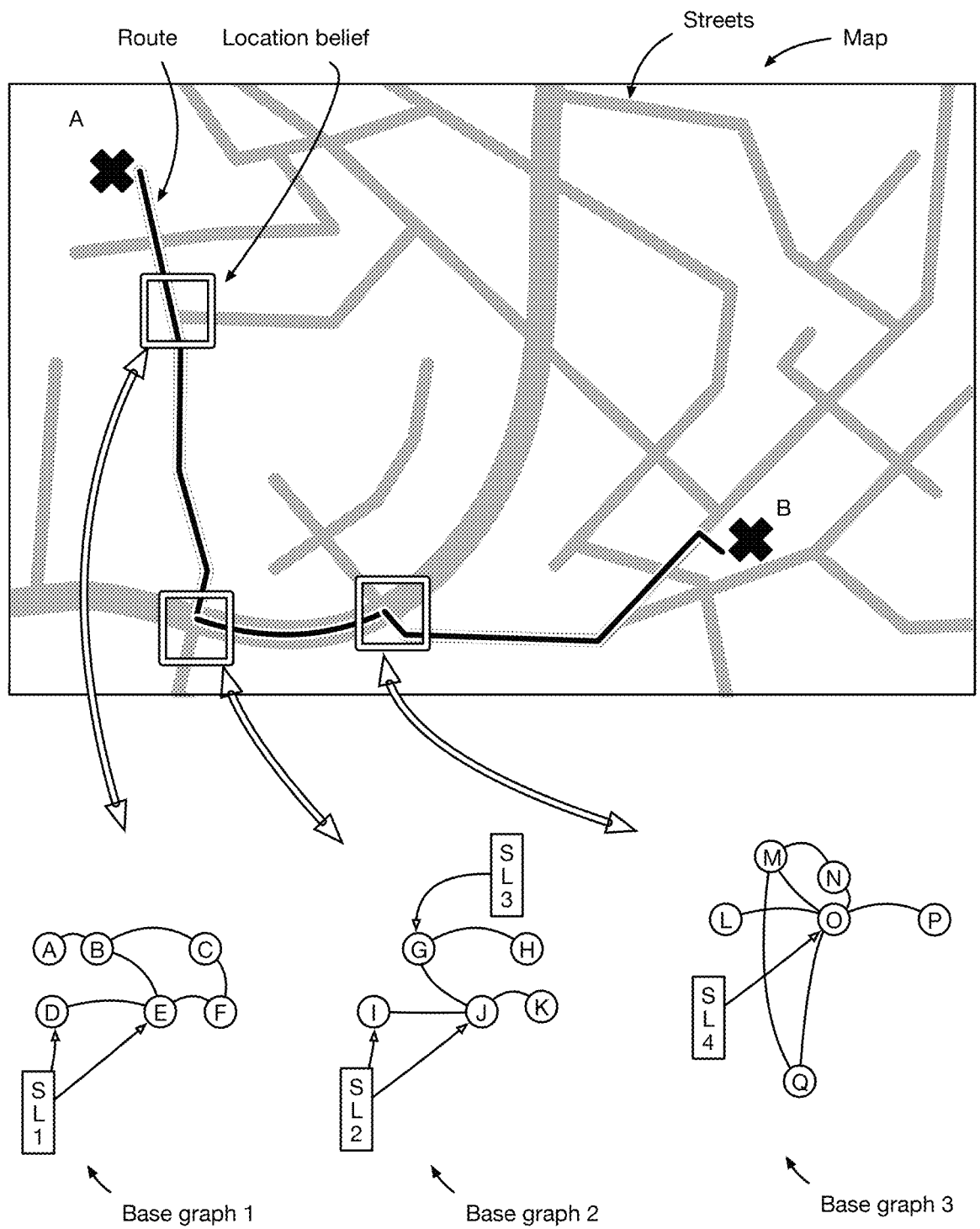
FIG. 10 is a schematic representation of a variant of base graphs associated with locations of a map.

Determining a base graph S210 preferably includes extracting a base graph associated with a location belief (e.g., example shown in FIG. 10), but can alternatively include any other suitable process.

In a first variant, determining a base graph S210 can include extracting a whole base graph based on location belief (e.g., via lookup table).

In a second variant, determining a base graph S210 can include identifying a set of nodes and edges in a larger base graph (e.g., a subset of a base graph representing the entire fixed route).

In a third variant, determining a base graph S210 can include predicting (e.g., extrapolating, etc.) location of autonomous vehicle based on known previous locations.

However, a predetermined base graph can be otherwise determined.

In a second variation, the base graph is determined using S220, wherein nodes representing scene elements and edges representing element relationships are extracted from the measurements.

In a third variation, the base graph is determined from a predetermined map of the location. The map is preferably a mid-fidelity map (e.g., a 2D or 2D map with height values that includes lane-level details), but can additionally or alternatively be a high-fidelity map (e.g., a LIDAR map, a 3D map, etc.) or a low-fidelity map (e.g., a 2D map that includes road corridors and directionality, but lacks lane-level details). The map preferably identifies road elements (e.g., lanelets, traffic control elements, etc.), wherein nodes are generated for each road element in the scene. The edges can be generated heuristically, based on the relationships between the road elements extracted from the map. For example, a lanelet node can be connected to a traffic light node controlling traffic on the lanelet, but is not connected to a stop sign on a different road. The edge weights can be assigned: heuristically (e.g., based on the map relationships, based on the nodes connected by the edge, etc.); probabilistically (e.g., based on historical dependency and/or influence between the node elements); randomly assigned; and/or otherwise assigned.

However, determining a base graph S210 may be otherwise performed.

Determining a set of nodes and edges from observations S220 functions to generate the scene graph.

The set of nodes and edges can be generated de novo, but can alternatively be generated from base graph (e.g., from S210). For example, the nodes and edges can be generated from base map generated in prior iteration of the method (e.g., previous timestep). In a second example, the nodes and edges can be generated from stored base map extracted based on location.

Determining a set of nodes and edges from observations S220 is preferably performed after S210, but can alternatively be performed at any other suitable time.

Determining a set of nodes and edges from observations S220 is preferably performed substantially in real-time.

Determining a set of nodes and edges from observations S220 is preferably performed by scene parsing module 520, but can alternatively be performed by another system component.

Nodes can be based on element detections extracted from observations (and/or determined based on embeddings thereof) using object detection models (e.g., YOLO, R-CNN, etc.), semantic segmentation, instance segmentation, landmark detection, superpixel segmentation (e.g., using simple linear iterative clustering (SLIC), Felzenswalb, etc.), and/or any other suitable element detection method.

Each node can represent a different element in the scene (e.g., a different node is generated for each unique element detected within the scene). Attributes of the node (e.g., element class, depth, size, state, etc.) can be assigned to the node as node parameters or otherwise associated with the node.

Determining a set of nodes and edges from observations S220 can include determining new nodes, new edges, and/or any other suitable substep.

Determining new nodes function to update and refine the scene graph representation of the autonomous vehicle's surroundings.

In a first variant, nodes in a scene graph (e.g., a base graph) can be edited to reflect changes in parameters and/or weights of nodes and/or edges represented in the scene graph. The changes can be determined from observations, but can additionally and/or alternatively be extrapolated based on rate of change of parameter values determined at prior timestep.

In a second variant, nodes and/or edges can be added to the scene graph based on features extracted from observations (e.g., features generated by the scene feature generation module, etc.).

In a third variant, nodes and/or edges can be pruned from the scene graph based on their saliency to adjacent nodes, a target node, an ego node, and/or any other suitable reference points. The nodes and/or edges can be pruned based on edge weight, distance, edge complexity, and/or any other suitable criteria.

However, new nodes may be otherwise determined.

New edges can be determined based on static parameters of nodes and/or dynamic parameters of nodes. For example, when a light changes color, different relationships become more relevant to different nodes, and a scene map is re-determined to reflect the change.

In a first variant, for each new node, dense candidate edges (e.g., edges connecting the new node to over 10%, over 20%, over 50%, over 75%, over 90%, 100% of other nodes; edges connecting the new node to over 1, over 5, over 10, over 20 other nodes, etc.) are added and assigned a weight/relevance to ego node, then edges are pruned based on the weight/relevance.

In a second variant, for each new node, a first set of edges are added connecting the new node to a set of neighboring existing nodes. Edges of neighboring existing nodes are used to initialize new edges of new node. Neighboring existing nodes can include nodes representing elements within threshold physical distance or collocated elements (e.g., lane of vehicle occupying said lane is a "neighbor" to the vehicle). Neighboring existing nodes can additionally or alternatively include nodes within threshold graph distance (e.g., number of edges), and/or be otherwise defined.

The weights for new edges can be copied from existing edges, aggregated based on predetermined edges in the scene graph and/or existing edge weights (e.g., averaged, calculated using a deterministic function, determined using a set of heuristics, etc.), and/or otherwise determined. In a first example, new node representing vehicle in lane X adopts the edges associated with lane X connecting it to other lanes, stoplights, and/or any other suitable elements.

In a third variant, a neural network (e.g., GNN) trained to predict edges/edge weight is run using base graph and the new node as inputs. In a first example, this can include feature-based regression, graph neural network, and/or any other suitable neural network approach. The neural network can be trained to predict salience of node to ego node, wherein the salience is assigned as the edge weight.

In a fourth variant, edge weights are initialized (e.g., using any variant described above), then refined via learning model (e.g., using GNN of the third variant).

However, the edges can be otherwise defined. New edges can be determined probabilistically or heuristically. New edges can be determined based on the salience of new node, distance of new node (physical distance, graph distance, etc.), type of new node, and/or any other suitable factors. New edges can additionally or alternatively be determined based on neighboring node/edge weights. New edge weights can be the average of nearest neighbors, distance-weighted average of nearest neighbors, bilinear interpolation, trilinear interpolation, and/or otherwise determined. When using edges of neighbors to initialize edge weights, edge weights of neighbors can be weighted or unweighted by neighbor weights. Neighbor weights can be or can be based on: inverse of distance, bilinear interpolation, trilinear interpolation, cluster-based assignment, rate of change of node parameters, salience of neighbor node to ego node/target node, and/or any other suitable factors. In a first example, edge between elements includes a weight which reflects graph distance between connected nodes.

However, new edges may be otherwise determined.

However, determining a set of nodes and edges from observations S220 may be otherwise performed. However, determining a scene graph S200 may be otherwise performed.

Determining a set of scene features S300 functions to determine a set of inputs for a behavior model.

In variants, the method can optionally include or exclude S300. When the method excludes S300, the measurements can be provided to the behavior model directly. In a first variant, the method can optionally include determining a set of scene features S300. When the method includes determining a set of scene features S300, the scene features can be provided to the behavior model as inputs.

In a second variant, the method can optionally exclude determining a set of scene features S300. When the method excludes determining a set of scene features S300, the measurements can be provided to the behavior model directly.

Determining a set of scene features S300 can be performed after recording a set of observations S100, but can additionally and/or alternatively be performed at any other suitable time. The scene features are preferably determined based on observations (e.g., from S100), but can additionally and/or alternatively be based on a scene graph/features (e.g., from S200), or be determined based on any other suitable information.

Determining a set of scene features S300 can be performed by scene feature generation module 530, but can additionally and/or alternatively be performed by any other suitable module or component. Determining a set of scene features S300 can be determined heuristically or deterministically.

Scene features can be extracted from observations and/or embeddings thereof using SIFT, SURF, ORB, superpixel segmentation (e.g., SLIC, Felzenswalb, and/or any other suitable superpixel segmentation method), object detection models (YOLO, R-CNN), semantic segmentation, instance segmentation, landmark detection, region proposals, classifiers, and/or any other suitable feature extraction method. Scene features can additionally and/or alternatively be generated from refinements or aggregations of features. Examples of feature refinement or aggregation methods that can be used can include: factor analysis, principal component analysis, regressions, clustering, thresholding, spatial billing, quantization, outlier removal, temporal integration (e.g., for tracking features across time steps, and/or any other suitable temporal integration method), dimensionality reductions, and/or any other suitable refinement or aggregation method.

Determining a set of scene features S300 can be further encoded, and/or processed in any other suitable manner. Features can be associated with nodes in the scene graph, or otherwise associated with a node (e.g., for use when using an attention coefficient matrix extracted from the scene graph).

However, determining a set of scene features S300 may be otherwise performed.

Predicting agent behavior based on the scene graph functions to determine information about agent motion for an agent represented by a target node in the scene. The target node can be separate from the ego node (e.g., representing the autonomous vehicle), but can alternatively be the same node.

Predicting agent behavior based on the scene graph can predict behavior of all dynamic nodes in scene, a subset of dynamic nodes, one dynamic node, and/or any other suitable node (e.g., dynamic or static). The subset of dynamic nodes can include dynamic nodes of a particular class (e.g., pedestrians, bicycles, vehicles, etc.), dynamic nodes of a particular level of importance (e.g., above a predetermined threshold value), dynamic nodes representing dynamic elements within a predetermined area (e.g., lane, etc.), and/or any other suitable dynamic node.

The agent behavior is preferably predicted after S200 or S300, but can additionally and/or alternatively be performed at any other suitable time. The agent behavior is preferably predicted (e.g., directly or indirectly) based on the relevance of the target node to the ego node, but can alternatively be performed without using relevance of the target node to the ego node.

Figure 3:
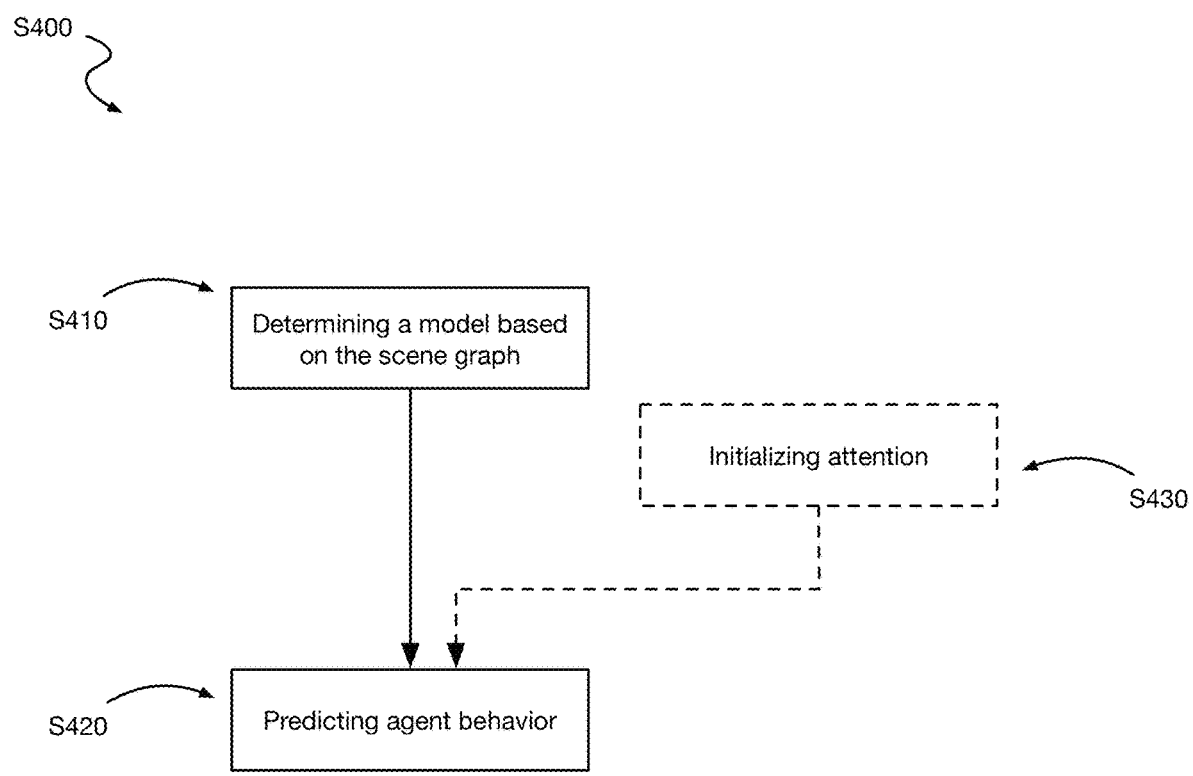
FIG. 3 is a schematic representation of a variant of predicting agent behavior based on the scene graph.

Predicting agent behavior based on the scene graph can include determining a model based on the scene graph S410, predicting agent behavior S420, initializing attention. S430, and/or any other suitable substeps (e.g., example shown in FIG. 3).

Determining a model based on the scene graph S410 functions to select a model for predicting agent behavior based on the information contained in the scene graph.

In a first variant, determining a model based on the scene graph S410 includes selecting a model based on the scene graph, which functions to use a model appropriate for the desired level of behavior prediction accuracy. For example, a heuristic, associated with a lower accuracy, can be used to predict a behavior for a less important node (e.g., interpolate the location along a trajectory); while a probabilistic model, associated with a higher accuracy, can be used to predict a behavior for a high importance node (e.g., to determine likelihood of different behaviors). Selecting a model based on the scene graph is preferably performed by behavior model selection module 540, but can alternatively be performed by other system components.

The model can be selected based on relevance of the target node to a reference node (e.g., ego node, another non-ego node, etc.), and/or based on any other suitable parameter. The reference node can be directly and/or indirectly connected to target node within the scene graph. Relevance can represent importance, influence, and/or any other suitable relationship or effect of the target node on the reference node. Importance can be determined based on: the graph distance, based on the aggregated edge and/or node weights between the two nodes, and/or otherwise determined. Importance (and/or relevance) can be continuous, discrete (e.g., "important", "non important", etc.), and/or otherwise configured. In examples, a node can be high importance when the relevance (e.g., graph distance) is below a first threshold, optionally mid importance when the relevance (e.g., graph distance) is between a first and second threshold, and/or low importance when the relevance (e.g., graph distance) is lower than a second threshold (e.g., wherein the first and second threshold can be the same value when there is no mid importance node).

Relevance can be based on edge weights, distance, edge count, intervening node count, path count between nodes (e.g., how many distinct edges connect two nodes), and/or any other suitable factors. Relevance can be determined indirectly (e.g., wherein edges are pruned based on edge weights in S220, and the resultant graph is used to determined relevance) and/or directly (e.g., wherein weights are used to calculate relevance score, which is then evaluated using a set of thresholds of cumulative relevance scores/ edge weights to determine which models are selected). Relevance (e.g., importance) is preferably different from saliency (e.g., probability of interaction), but can alternatively be the same metric but with limited scope, or otherwise defined. For example, salience can be determined between a pair of node elements connected by a single edge or between immediate neighbors within the scene graph; relevance can be the same metric, but determined between a secondary node and a target node, and is not limited to a predetermined graph distance. However, salience and relevance can be otherwise defined.

Relevance can be determined based on the complexity associated with a second node, wherein the second node is directly or indirectly connected to the target node. For example, a parking space can have low relevance while an intersection can have high relevance. Relevance can also be determined based on distance of the target node from a second node in graph space, physical space, and/or any other suitable space. This distance can be based on number of intermediate edges, length of intermediate edges, weight of intermediate edges, and/or any other suitable factors. Edge weight can also be a factor in determining relevance. Relevance can be a combination of the aforementioned values, and/or otherwise determined.

The model can also be selected based on attributes of the target node. Examples of attributes of the target node that can be used can include: the rate of change of parameters of the target node (e.g., is this element speeding up, slowing down, etc.); how recently the target node was added to the scene graph; and/or other attributes of the target node.

The model can also be selected based on attributes of edges connected to the target node. Examples of attributes of edges connected to the target node that can be used can include: the complexity of relationships represented by edges (e.g., as represented by edge weights); the number of edges connected to target node; and/or other attributes.

The model can include a behavior model that uses any suitable type of deterministic and/or probabilistic mechanisms to determine and/or predict behavior. Selecting a model can include selecting multiple models or a single model for a given node. In variants, when selecting multiple models, the process can include aggregating multiple models. For example, different models of varying complexity can be used for different permutations of parameter values (e.g., for a car on the highway, a simple model for predicting likelihood of slamming on the brakes and a complex model for trajectory).

In a second example, different models (e.g., different sizes, modalities, methods, and/or any other suitable characteristics) can be used for different nodes when parsing the same scene. In a specific example, one model for node A is probabilistic and another for node B is deterministic.

In a second variant, determining the behavior model can include initializing attention of a behavior model S430, which functions to use relationships extracted from a scene graph to inform attention of an attention-based behavior model. This can be based on information from the scene graph, extracted directly from scene graph, and/or any other suitable source. For example, information can be extracted from an adjacency matrix of scene graph, where for each row i and column j of the adjacency matrix, a value (e.g., a scalar, vector, matrix, etc.) represents weights and/or connections between nodes.

In a first variant of initializing attention, the attention coefficient tensor (e.g., matrix) can be the edge weights of scene model (e.g., weighted adjacency matrix).

In a second variant of initializing attention, the attention coefficient tensor can be a binary adjacency matrix.

Initializing attention of a behavior model S430 can be performed before S420 and after S410, but can alternatively be performed at another suitable time. The model can be subsequently trained based on the measurement set and/or successive measurements (e.g., the attention coefficients and/or adjacency matrix are learned by adjusting the initial, graph-derived values).

An example attention coefficient formula can be used, where w represents edge weight and alpha represents attention coefficient:

$$\alpha_{ij} = \frac{w_{ij}}{\sum_{k \in N(i)} w_{ik}}$$

where $a_{ij}$ is the attention coefficient and $w_{ij}$ is the weight between node i and node j.

However, determining a model based on the scene graph may be otherwise performed.

However, predicting agent behavior based on the scene graph may be otherwise performed.

Predicting agent behavior S420 functions to use the selected model to predict a behavior of the agent.

Predicting agent behavior S420 is preferably performed after S410, but can alternatively be performed at any other time. Predicting agent behavior S420 can be performed by the behavior model(s) 550, the selected behavior models from S410, but can alternatively be performed by other system components.

Predicting agent behavior S420 can optionally include predicting a confidence alongside a behavior. Predicting agent behavior S420 can optionally include re-determining behavior using a more complex model responsive to low confidence.

Predicting agent behavior S420 can include using attention coefficients and/or other attention-based mechanism initialized in S430. In a first example, attention coefficients are initialized in S430 and not changed. In a second example, a subset of attention coefficients are changed during prediction. In a third example, all attention coefficients are refined during prediction.

However, predicting agent behavior S420 may be otherwise performed.

Controlling an autonomous vehicle S500 functions to determine and/or execute control instructions for the autonomous vehicle.

Controlling an autonomous vehicle S500 is preferably performed after S400, but can alternatively be performed at another suitable time. Controlling an autonomous vehicle S500 can be performed before, concurrently with, contemporaneously with next iteration of S100 and/or other processes.

Controlling an autonomous vehicle S500 is preferably performed by the motion planner 560, but can alternatively be performed by another suitable system component.

The ordering of controlling an autonomous vehicle S500 can be configured in different ways. In a first variant, behavior models predict motion for other agents, and controlling an autonomous vehicle S500 includes determining control instructions for the ego autonomous vehicle (e.g., using model which is not a behavior model). In a second variant, behavior models predict motion for other agents, then a behavior model predicts motion for ego autonomous vehicle, and controlling an autonomous vehicle S500 converts predicted motion of ego vehicle into control instructions. In a third variant, a behavior model predicts motion for ego autonomous vehicle, and controlling an autonomous vehicle S500 converts predicted motion of ego vehicle into control instructions.

The autonomous vehicle can be controlled in various ways. In a first variant, behavior is treated as an action, wherein the action is converted into a trajectory using a trajectory model. The trajectory model is preferably separate and distinct from the behavior model (e.g., "action model"), but can alternatively be configured in other suitable ways. In a second variant, the trajectory can be converted into control instructions (e.g., motion planning commands). This can include throttle control, steering control, braking control, headlight control, and/or any other suitable control. In a third variant, controlling an autonomous vehicle S500 includes relaying vehicle controls to vehicle components. However, the autonomous vehicle can be otherwise controlled.

Controls can be sent via CAN bus, DBW system, ECU, ethernet, pulse width modulation, serial communication, direct analog control, haptic feedback, and/or any other suitable method.

However, controlling an autonomous vehicle S500 may be otherwise performed.

6. SPECIFIC EXAMPLES

Example 1. A method, comprising: capturing a set of measurements of a scene surrounding a vehicle; generating a scene graph based on the set of measurements, the scene graph comprising: a set of nodes representing the vehicle and entities within the scene, wherein the entities comprise static entities and dynamic entities; and a set of edges connecting the set of nodes, each edge representing a probability of interaction between the entities represented by nodes connected by the respective edge; determining a relevance of a target node within the set of nodes to the vehicle based on the scene graph; selecting a behavior model based on the relevance and the edges connected to the target node; predicting a behavior of a target entity associated with the target node using the selected behavior model; and controlling the vehicle based on the predicted behavior of the target entity.

Example 2. The method of Example 1, wherein selecting the behavior model comprises determining a relevance of the target node to an ego node representing the vehicle based on the graph, wherein the behavior model is selected based on the relevance of the target node to the ego node.

Example 3. The method of Example 1, wherein the relevance of the target node is determined based on a graph distance between the target node and the ego node.

Example 4. The method of Example 3, wherein selecting the behavior model based on the relevance comprises: selecting a deterministic model to predict the behavior of the target node when the relevance is lower than a first threshold relevance; and selecting a probabilistic model to predict the behavior of the target node when the relevance is higher than a second threshold relevance.

Example 5. The method of Example 4, wherein the deterministic model comprises a numerical solver, and wherein the probabilistic model comprises a neural network.

Example 6. The method of Example 4, wherein the target node represents a vehicle.

Example 7. The method of Example 1, wherein generating the graph comprises: deterministically assigning edge weights, based on the set of measurements, to edges connecting static entities; and probabilistically assigning edge weights, based on the set of measurements, to edges connected to a dynamic entity; and pruning edges associated with edge weights lower than a threshold.

Example 8. The method of Example 1, further comprising: determining a geographic location of the vehicle; and retrieving a location-specific base graph corresponding to the geographic location; wherein generating the graph comprises modifying the retrieved location-specific base graph.

Example 9. The method of Example 8, wherein the location-specific base graph comprises a predetermined set of nodes representing static elements in the scene, a predetermined set of edges representing relationships between the static elements, and predetermined edge weights associated with the predetermined set of edges.

Example 10. The method of Example 8, further comprising: when a static scene change is detected, updating the retrieved location-specific base graph based on the set of measurements; and using the updated location-specific base graph as the location-specific base graph in a subsequent iteration of the method.

Example 11. The method of Example 1, wherein the set of nodes comprise a node with a dynamic state, wherein edge weights of edges linked to the node are determined based on the dynamic state.

Example 12. The method of Example 1, wherein the selected behavior model comprises an attention mechanism, wherein attention coefficients of the attention mechanism are initialized based on the edge weights.

Example 13. The method of Example 1, wherein predicting the behavior of the target entity comprises performing a joint prediction with a second behavior of a second entity.

Example 14. A method for autonomous agent control, comprising: determining a location of the autonomous agent; retrieving a predetermined scene graph corresponding to the location of the autonomous agent, wherein the predetermined scene graph comprises: a first set of nodes representing static elements in a scene; and a first set of edges interconnecting the first set of nodes and representing relationships between the respective static elements; at a sensor system of the autonomous agent, capturing measurements of the scene; based on the measurements, adding a second set of nodes representing dynamic agents within the scene to the scene graph; determining a second set of edges connecting nodes within the first set of nodes to nodes within the second set of nodes based on the measurements and the predetermined first set of edges; for a vehicle represented by a vehicle node within the second set of nodes, determining a next behavior of the vehicle based on the second set of edges; and controlling the autonomous agent based on the next behavior of the vehicle.

Example 15. The method of Example 14, wherein determining the next behavior of the vehicle comprises selecting a behavior model based on a relationship between the vehicle node and an ego node representing the autonomous agent.

Example 16. The method of Example 15, wherein the behavior model is selected based on an edge weight of a set of edges connecting the vehicle node and the ego node satisfying a threshold.

Example 17. The method of Example 14, wherein the next behavior is predicted conditionally on a predicted next behavior of another vehicle in the scene.

Example 18. The method of Example 14, wherein weights of the first set of edges remain static between retrieving the scene graph and determining the next behavior of the vehicle.

Example 19. The method of Example 14, wherein during a first iteration of the method performed at a first timestep, the next behavior of the vehicle is determined deterministically, and wherein during a second iteration of the method performed at a second timestep, the next behavior of the vehicle is determined probabilistically.

Example 20. The method of Example 14, wherein the next behavior is determined using a behavior model comprising an attention layer initialized using edge weights from the scene graph.

All references cited herein are incorporated by reference in their entirety, except to the extent that the incorporated material is inconsistent with the express disclosure herein, in which case the language in this disclosure controls.

As used herein, "substantially" or other words of approximation can be within a predetermined error threshold or tolerance of a metric, component, or other reference, and/or be otherwise interpreted.

Optional elements, which can be included in some variants but not others, are indicated in broken line in the figures.

Different subsystems and/or modules discussed above can be operated and controlled by the same or different entities. In the latter variants, different subsystems can communicate via: APIs (e.g., using API requests and responses, API keys, etc.), requests, and/or other communication channels. Communications between systems can be encrypted (e.g., using symmetric or asymmetric keys), signed, and/or otherwise authenticated or authorized.

Alternative embodiments implement the above methods and/or processing modules in non-transitory computer-readable media, storing computer-readable instructions that, when executed by a processing system, cause the processing system to perform the method(s) discussed herein. The instructions can be executed by computer-executable components integrated with the computer-readable medium and/or processing system. The computer-readable medium may include any suitable computer readable media such as RAMs, ROMs, flash memory, EEPROMs, optical devices (CD or DVD), hard drives, floppy drives, non-transitory computer readable media, or any suitable device. The computer-executable component can include a computing system and/or processing system (e.g., including one or more collocated or distributed, remote or local processors) connected to the non-transitory computer-readable medium, such as CPUs, GPUs, TPUS, microprocessors, or ASICs, but the instructions can alternatively or additionally be executed by any suitable dedicated hardware device.

Embodiments of the system and/or method can include every combination and permutation of the various system components and the various method processes, wherein one or more instances of the method and/or processes described herein can be performed asynchronously (e.g., sequentially), contemporaneously (e.g., concurrently, in parallel, etc.), or in any other suitable order by and/or using one or more instances of the systems, elements, and/or entities described herein. Components and/or processes of the following system and/or method can be used with, in addition to, in lieu of, or otherwise integrated with all or a portion of the systems and/or methods disclosed in the applications mentioned above, each of which are incorporated in their entirety by this reference.

As a person skilled in the art will recognize from the previous detailed description and from the figures and claims, modifications and changes can be made to the preferred embodiments of the invention without departing from the scope of this invention defined in the following claims.

We claim:

1. A method, comprising:
    capturing a set of measurements of a scene surrounding a vehicle;
    generating a scene graph based on the set of measurements, the scene graph comprising:
        a set of nodes representing the vehicle and entities within the scene, wherein the entities comprise static entities and dynamic entities; and
        a set of edges connecting the set of nodes, each edge representing a probability of interaction between the entities represented by nodes connected by the respective edge;
    based on the scene graph, determining a relevance of a target node within the set of nodes to an ego node representing the vehicle within the set of nodes;
    based on the relevance of the target node and edges connected to the target node, selecting a behavior model from a plurality of candidate behavior models, wherein the plurality of candidate behavior models comprises a deterministic behavior model and a probabilistic behavior model;
    predicting a behavior of a target entity associated with the target node using the selected behavior model; and
    controlling the vehicle based on the predicted behavior of the target entity.

2. The method of claim 1, wherein selecting the behavior model comprises determining a relevance of the target node to the ego node representing the vehicle based on the scene graph, wherein the behavior model is selected based on the relevance of the-target node-to the ego node.

3. The method of claim 1, wherein the relevance of the target node is determined based on a graph distance between the target node and the ego node, wherein the graph distance comprises a number of serial edges in a path linking the target node to the ego node.

4. The method of claim 1, wherein selecting the behavior model from the plurality of candidate behavior models based on the relevance comprises, for the target entity:
    selecting the deterministic behavior model to predict the behavior of the target entity when the relevance is lower than a first threshold relevance,
    wherein the method further comprises, for a second target entity associated with a second target node of the scene graph:
        selecting the probabilistic behavior model to predict a behavior of the second target entity when a second relevance of the second target node to the ego node is higher than a second threshold relevance.

5. The method of claim 4, wherein the deterministic behavior model comprises a numerical solver, and wherein the probabilistic behavior model comprises a neural network.

6. The method of claim 4, wherein the target node represents a second vehicle.

7. The method of claim 1, wherein generating the scene graph comprises:
deterministically assigning edge weights, based on the set of measurements, to edges connecting static entities;
probabilistically assigning edge weights, based on the set of measurements, to edges connected to a dynamic entity; and
pruning edges associated with edge weights lower than a threshold.

8. The method of claim 1, further comprising:
determining a geographic location of the vehicle; and
retrieving a location-specific base graph corresponding to the geographic location, wherein the location-specific base graph is predetermined for a fixed route corresponding to the geographic location,
wherein generating the scene graph comprises modifying the retrieved location-specific base graph.

9. The method of claim 8, wherein the location-specific base graph comprises a predetermined set of nodes representing static elements in the scene, a predetermined set of edges representing relationships between the static elements, and predetermined edge weights associated with the predetermined set of edges.

10. The method of claim 8, further comprising:
when a static scene change is detected, updating the retrieved location-specific base graph based on the set of measurements; and
using the updated location-specific base graph as the location-specific base graph in a subsequent iteration of the method.

11. The method of claim 1, wherein the set of nodes comprise a node with a dynamic state, wherein edge weights of edges linked to the node are determined based on the dynamic state.

12. The method of claim 1, wherein the selected behavior model comprises an attention mechanism, wherein attention coefficients of the attention mechanism are initialized based on the edge weights.

13. The method of claim 1, wherein predicting the behavior of the target entity comprises performing a joint prediction with a second behavior of a second entity.

* * * * *

UNITED STATES PATENT AND TRADEMARK OFFICE
CERTIFICATE OF CORRECTION

PATENT NO. : 12,374,100 B2
APPLICATION NO. : 18/921601
DATED : July 29, 2025
INVENTOR(S) : Amir Yazdani et al.

It is certified that error appears in the above-identified patent and that said Letters Patent is hereby corrected as shown below:

In the Claims

Column 24, Line 51, In Claim 2, delete "the-target node-to" and insert --the target node to-- therefor Signed and Sealed this
Second Day of September, 2025

Coke Morgan Stewart
*Acting Director of the United States Patent and Trademark Office*